Feb. 8, 1966 S. A. DASHEW ETAL 3,234,358
DATA RECORDING AND PUNCHING MACHINE
Filed July 10, 1961 14 Sheets-Sheet 1
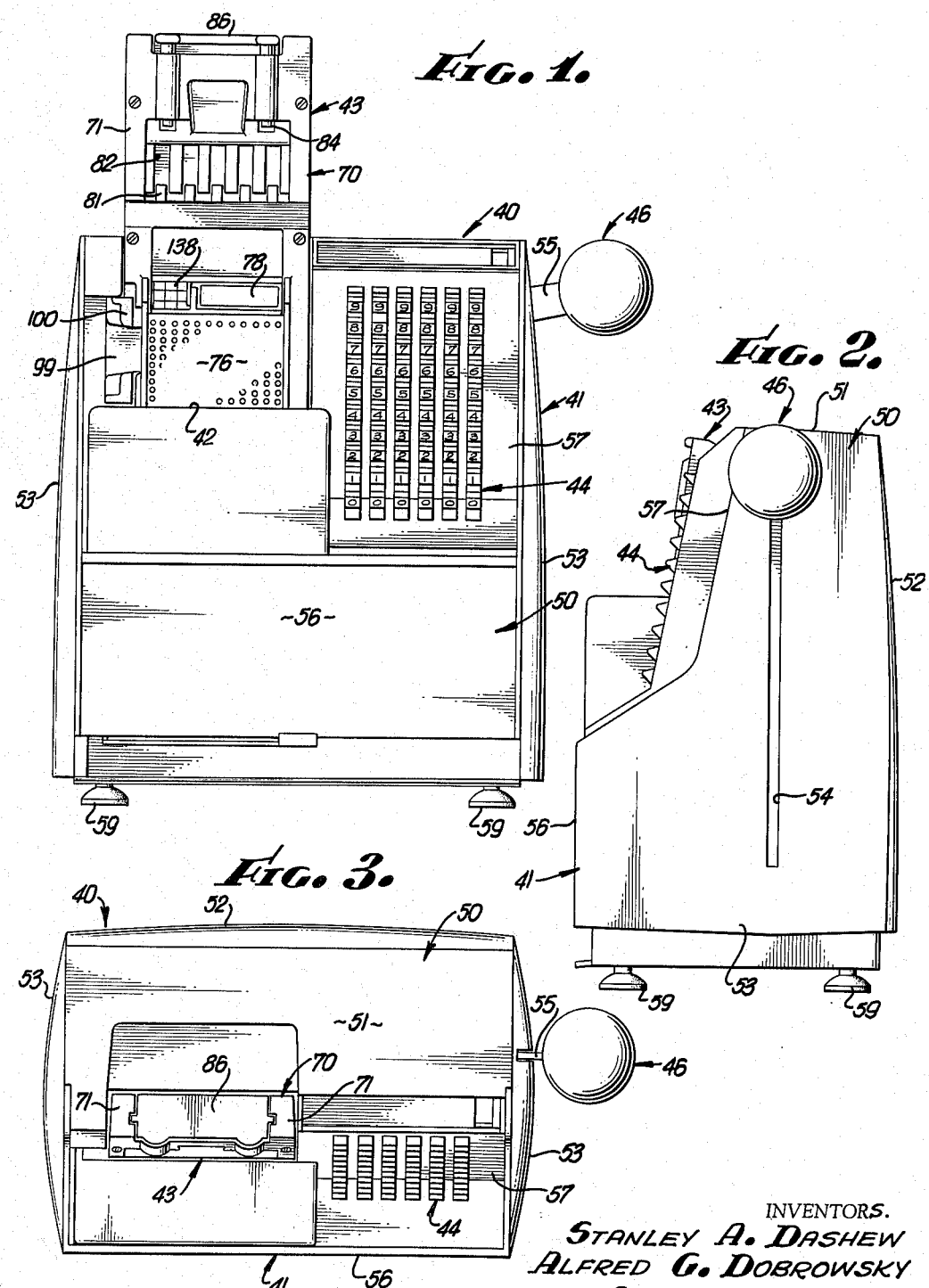
INVENTORS.
STANLEY A. DASHEW
ALFRED G. DOBROWSKY
By Miketta and Glenny
ATTORNEYS.

Feb. 8, 1966     S. A. DASHEW ETAL     3,234,358
DATA RECORDING AND PUNCHING MACHINE
Filed July 10, 1961     14 Sheets-Sheet 2
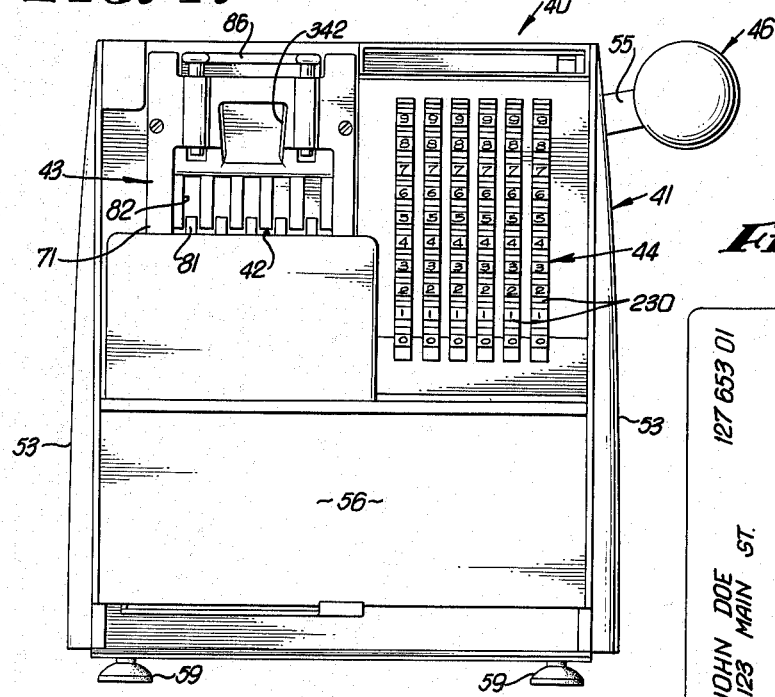
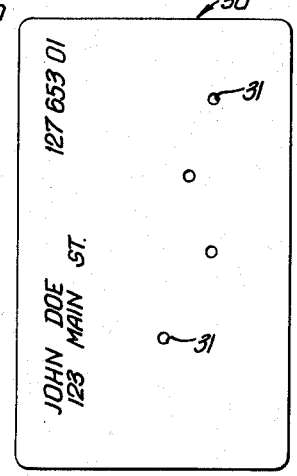
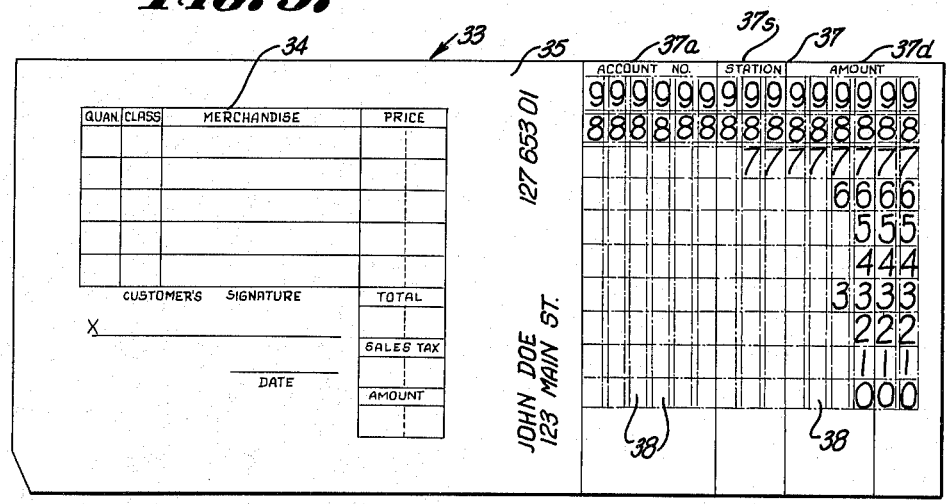
INVENTORS.
STANLEY A. DASHEW
ALFRED G. DOBROWSKY
By Miketta and Glenny
ATTORNEYS.

Feb. 8, 1966  S. A. DASHEW ETAL  3,234,358
DATA RECORDING AND PUNCHING MACHINE
Filed July 10, 1961  14 Sheets-Sheet 3

INVENTORS.
STANLEY A. DASHEW
ALFRED G. DOBROWSKY
By Miketta and Glenny
ATTORNEYS.

Feb. 8, 1966    S. A. DASHEW ETAL    3,234,358
DATA RECORDING AND PUNCHING MACHINE
Filed July 10, 1961    14 Sheets-Sheet 5
FIG. 9.
FIG. 10.
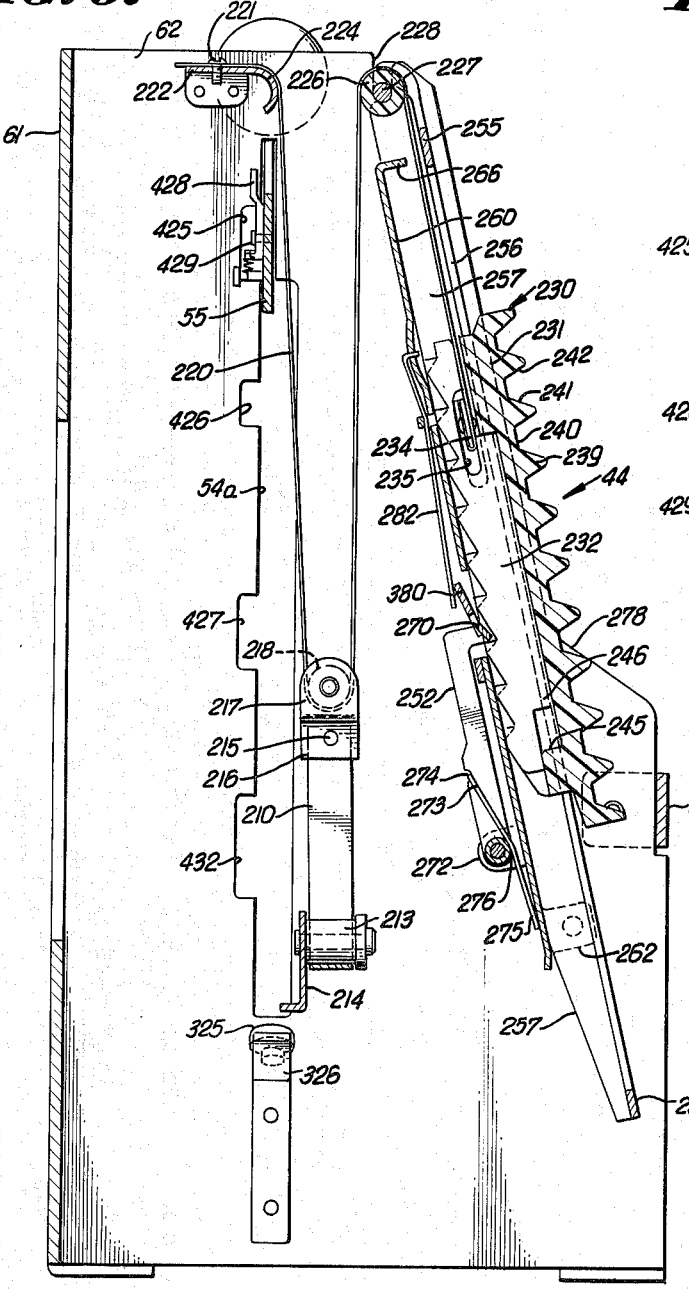
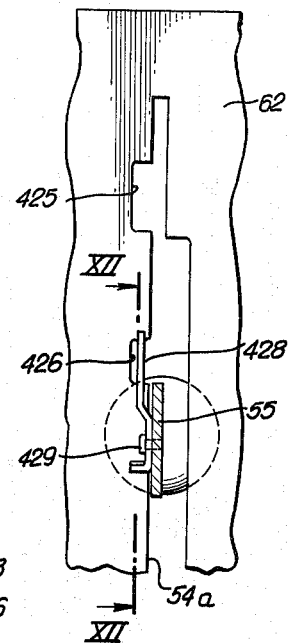
INVENTORS.
STANLEY A. DASHEW
ALFRED G. DOBROWSKY
By Miketta and Glenny
ATTORNEYS.

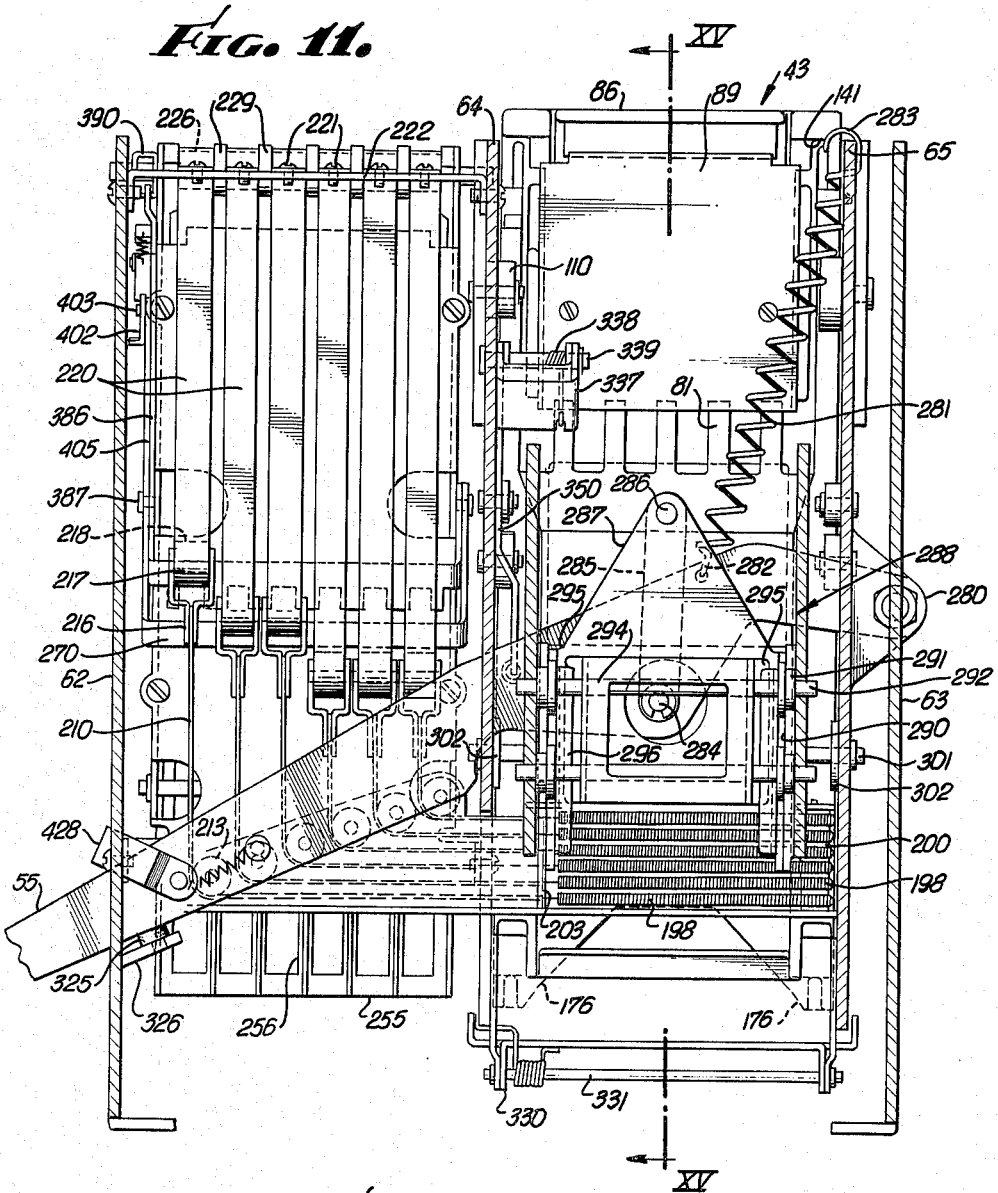
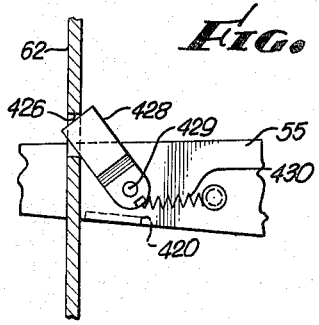

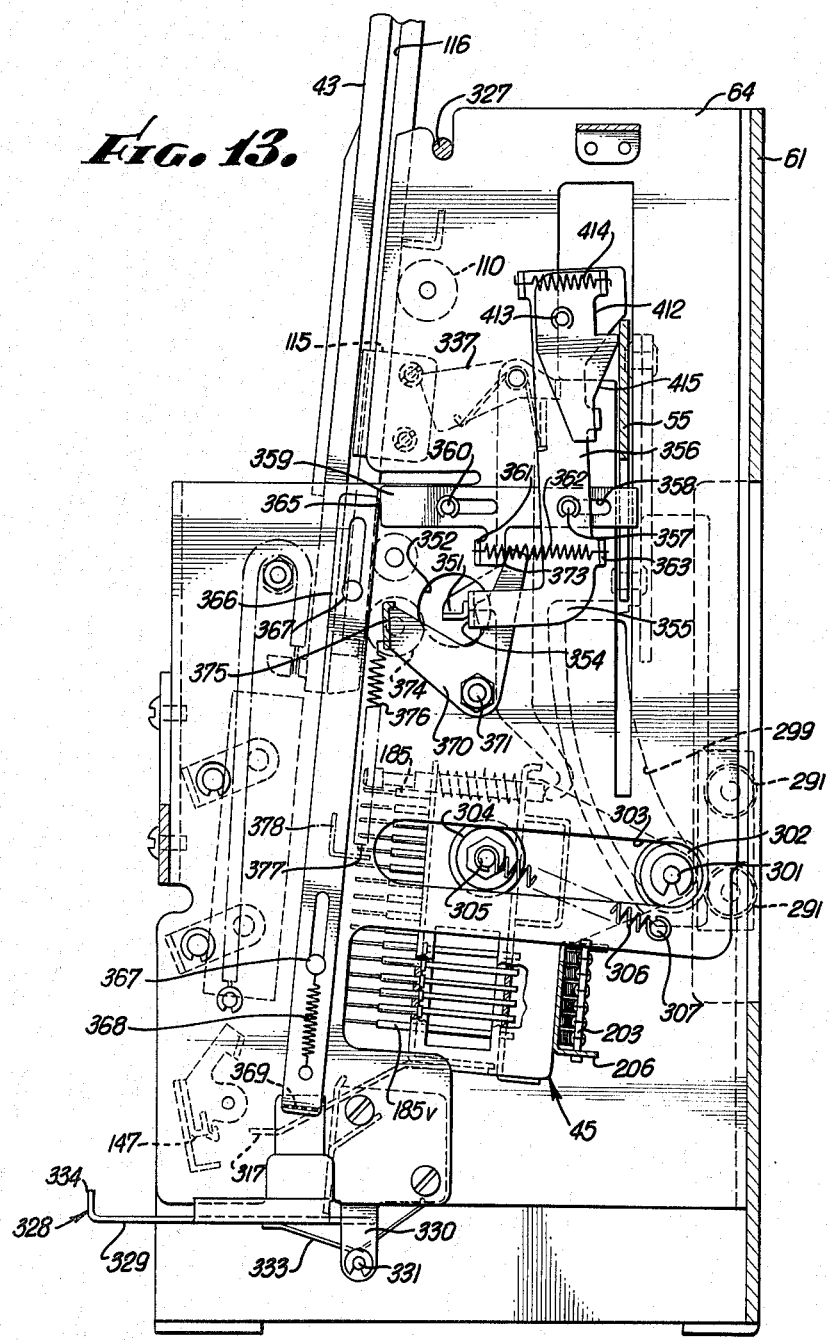

Feb. 8, 1966    S. A. DASHEW ETAL    3,234,358
DATA RECORDING AND PUNCHING MACHINE
Filed July 10, 1961    14 Sheets-Sheet 8

INVENTORS.
STANLEY A. DASHEW
ALFRED G. DOBROWSKY
By Miketta and Glenny
ATTORNEYS.

Feb. 8, 1966    S. A. DASHEW ETAL    3,234,358
DATA RECORDING AND PUNCHING MACHINE
Filed July 10, 1961    14 Sheets-Sheet 11
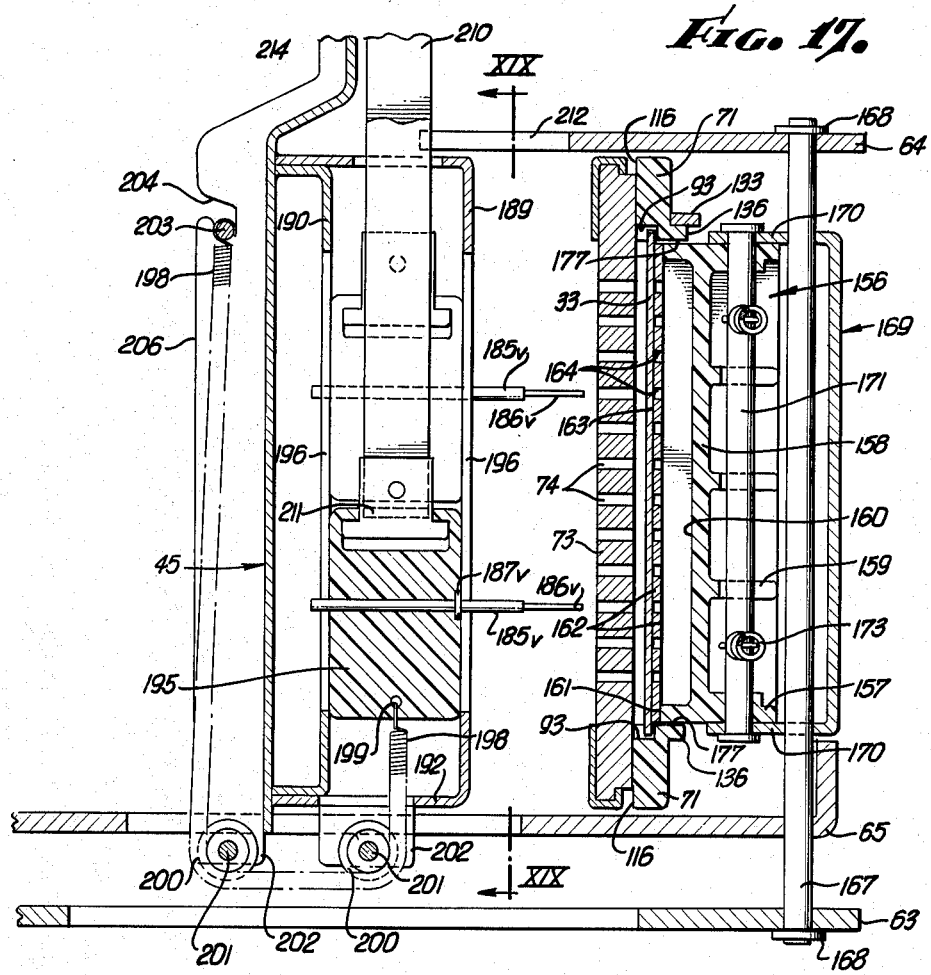
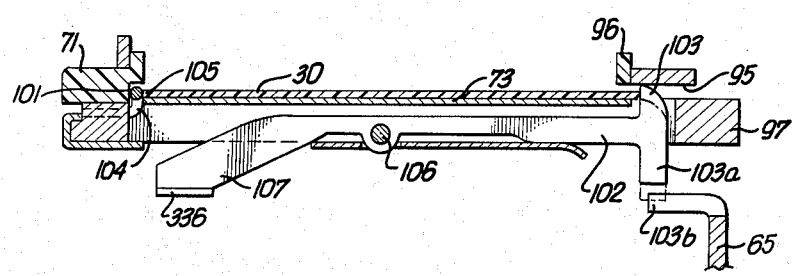
INVENTORS.
STANLEY A. DASHEW
ALFRED G. DOBROWSKY
By Miketta and Glenny
ATTORNEYS.

Feb. 8, 1966 S. A. DASHEW ETAL 3,234,358
DATA RECORDING AND PUNCHING MACHINE
Filed July 10, 1961 14 Sheets-Sheet 12
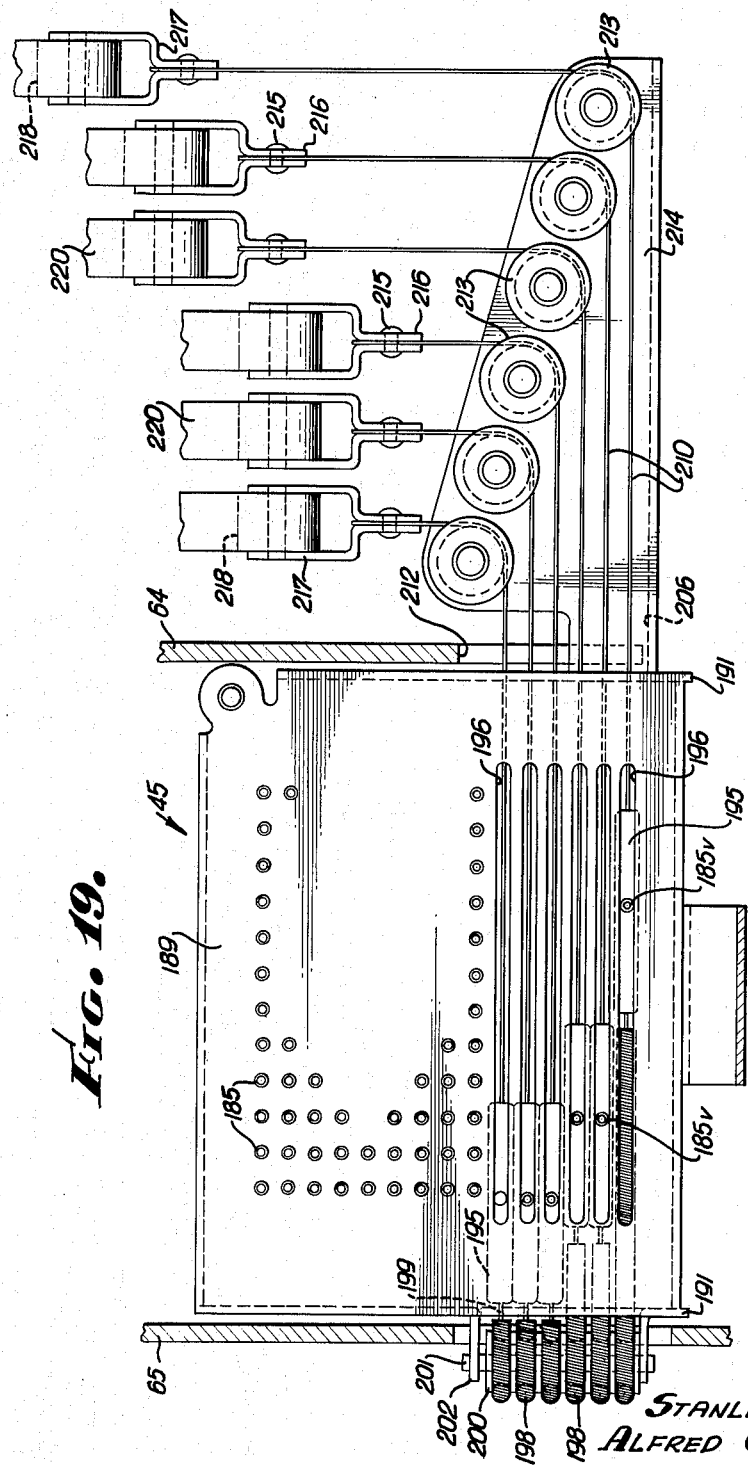
INVENTORS
STANLEY A. DASHEW
ALFRED G. DOBROWSKY
By Miketta and Glenny
ATTORNEYS.

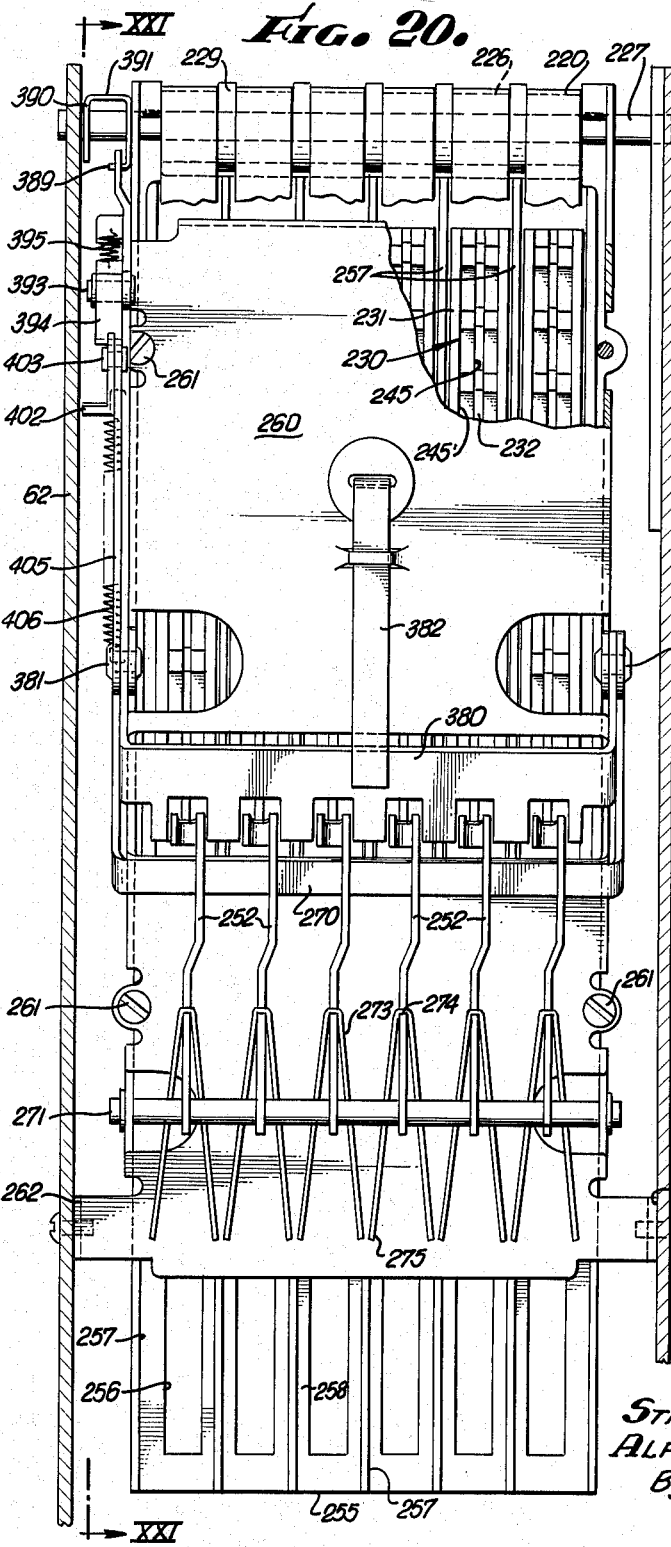
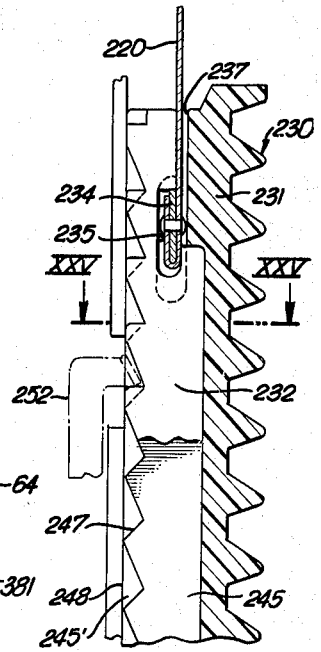
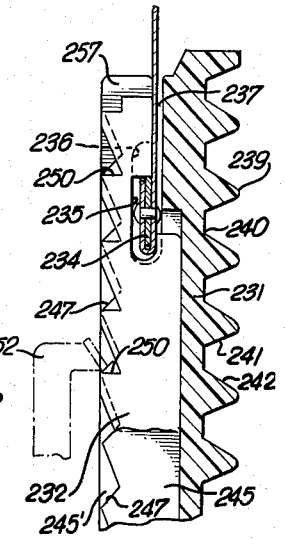
INVENTORS.
STANLEY A. DASHEW
ALFRED G. DOBROWSKY
By Miketta and Glenny
ATTORNEYS.

Feb. 8, 1966 S. A. DASHEW ETAL 3,234,358
DATA RECORDING AND PUNCHING MACHINE
Filed July 10, 1961 14 Sheets-Sheet 14
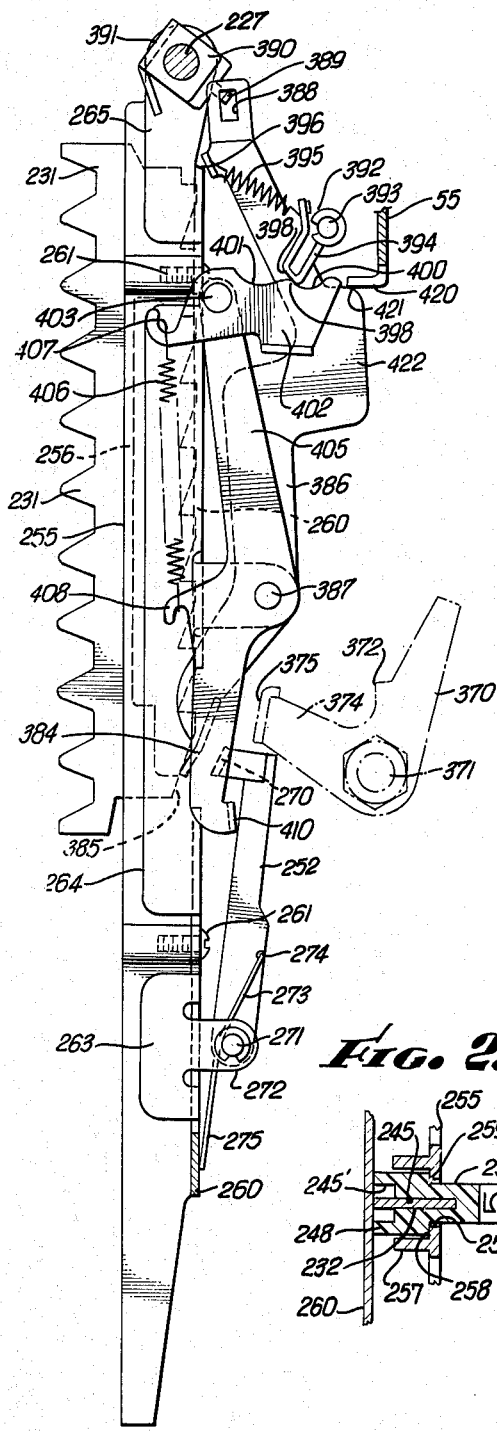
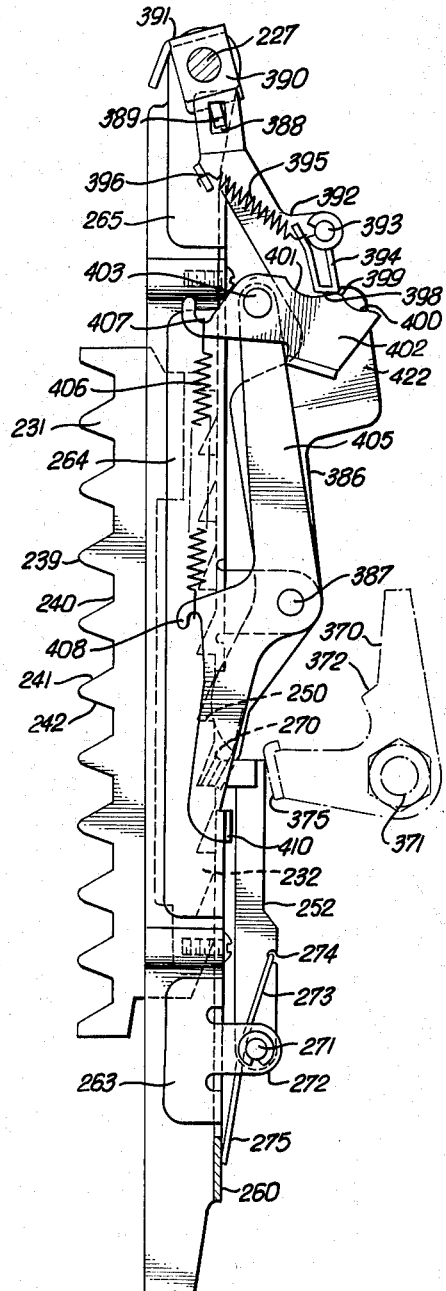
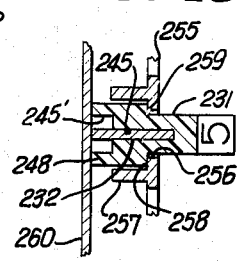
INVENTORS.
STANLEY A. DASHEW
ALFRED G. DOBROWSKY
By Miketta and Glenny
ATTORNEYS.

United States Patent Office 3,234,358
Patented Feb. 8, 1966

3,234,358
DATA RECORDING AND PUNCHING MACHINE
Stanley A. Dashew, Beverly Hills, and Alfred G. Dobrowsky, Los Angeles, Calif., assignors to Dashew Business Machines, Inc., Culver City, Calif., a corporation of Delaware
Filed July 10, 1961, Ser. No. 122,809
23 Claims. (Cl. 235—61.1)

This invention relates to a data recording machine and more particularly relates to a printing and punching machine adapted to print and record data at the place, location or source of at least part of such data.

The present invention contemplates a data recording machine adapted for use in a data processing system wherein information or data in code form as well as in uncoded form is translated and/or transferred to a data record from at a place or source where such data is provided or originates. Such a data recording machine provides means for eliminating certain processing operations which are presently customary in various data processing systems such as those employing IBM cards. A convenient example of the present invention to illustrate the use and operation of such a novel data recording machine is the employment of said machine with a credit card and a sales slip or data record form at the place or location where a sales transaction occurs. It will, of course, be understood that the data recording machine of the present invention may be employed in various other commercial and industrial applications wherein the need for handling such data in code form is convenient and efficient such as banking transactions involving checks and deposits, production and control inspection data, and production costs and labor costs and the like.

In the example of a sales transaction the present invention contemplates that a credit card be provided which not only bears the customer's name and address and account number in embossed printed form but which also includes this data in machine code form as provided by a selected arrangement of perforations or holes in the credit card. A data record form or sales slip is provided with a place for writing the amount of sale thereon and includes a relatively stiff card portion having prescored rectangular tabs thereon arranged for use in an IBM data processing system. The sales slip may thus be said to carry and provide information classified as significant data, that is, name, address and account number; constant data, that is, the station or location at which the transaction occurs; and variable data, that is, the amount in dollars of the specific sale transaction. The present data recording machine records such information in machine or code form and thus the sales slip portion bearing this information is capable of being immediately processed in a data system.

The data recording machine of the present invention contemplates a novel effective efficient construction and mode of operation for effecting the transfer or translation of such information to the data record form. The present invention contemplates a machine of compact form and construction which may be readily located on a sales counter. The data recording machine includes a vertically movable credit card and sales slip carrier means which is adapted to not only receive the same but to orient and position the credit card and sales slip in a position where a punching operation may be performed. The present machine contemplates a punching means which includes a movable punch block assembly having a plurality of spring biased punch pins arranged thereon in parallel lines and rows. The punch means also includes a fixed punch board spaced therefrom so that the carrier means may position the card and sales slip therebetween. Means for actuating the movable punch assembly includes a single pivoted movable actuating arm which during the course of its movement to down position and then during its return to its upper starting position produces the following sequence of operations, namely: movement of the punch assembly toward the punch board, alignment of the punch assembly with the carrier means and punch board, selection of pins for punching the sales slip as by alignment of the pins with holes in the credit card, punching the selected prescored tabs from the sales slip and depositing the tabs in a chamber for collection thereof, retraction of the punch assembly, release of the card carrier means so that the same may return to its normal position for withdrawal of the credit card and sales slip therefrom, and clearing of variable data selection means so that the machine will be in cleared condition for the next transaction. The present machine includes variable data selection means conveniently actuated for moving a punch pin on the punch block assembly into proper correlation with a tab on the sales slip corresponding to the amount desired to be recorded. Also included are means for printing the embossed information on the credit card and embossed constant data provided on the machine on the sales slip. The machine includes various other details of construction for effecting safeguards against misoperation of the machine.

It should be noted that prior proposed data recording machines which included punching mechanisms have usually required preselection of a movable punch element and locking of such preselected punch element prior to the punching operation. In such prior proposed punch mechanisms complex detailed construction was required to provide preselected or presensed punch elements, locking means for such elements, and holding means for those elements not selected. Such prior proposed mechanisms often required separation of the credit card and the sales slip and thus made more complex the handling of the information bearing means for proper orientation thereof in the prior proposed mechanism. The present invention contemplates a machine which obviates disadvantages of prior proposed similar mechanisms and incorporates advantages not found in prior proposed machines of this type.

The primary object of this invention, therefore, is to provide a novel construction and mode of operation of a compact data recording machine.

An object of the present invention is to design and provide a data recording machine wherein a printing and punching operation is performed in a single manual operational movement.

Another object of the invention is to disclose and provide a data recording machine adapted to perform a punching operation on a prescored data record card by a plurality of movable punch pins certain of which are biased and others of which are not biased.

Still another object of the invention is to design and provide a data recording means including a carrier means for a credit card and a data record form or card, said carrier means providing orientation of the cards and being movble for transporting said cards to a punching position or location.

Still another object of the invention is to disclose and provide a data recording means including punching means comprising a punch pin block assembly movable into punching relation with a data record card or form carried by the carrier means.

A further object of the invention is to disclose and provide such a punching means including a punch block assembly having a plurality of punch pins normally biased toward a fixed punch board and wherein certain of said pins are selected for punching engagement with said data form by alignment of the punch pins with selectively arranged holes in said credit card.

A still further object of the invention is to provide a punch block assembly as mentioned above wherein movable pins are provided on said assembly for alignment with prescored tabs on the data record form corresponding to the variable selected data.

A still further object of the invention is to disclose and provide a data recording machine including a housing having a front wall provided with an opening for movement of a carrier means for a credit card and sales slip and wherein variable data selection means are provided in adjacent side by side relation on said front wall.

The present invention contemplates a data recording and printing machine having various other important advantages including: a base of relatively small area so that a minimum of counterspace is occupied by the machine; an arrangement of component parts disposed generally vertically so as to present a minimum of horizontal surfaces for collection of dirt, dust, and other foreign particles, that is, relatively small edgelike faces whereby the machine is particularly adapted for use under adverse weather conditions or in an atmosphere contaminated by industrial dirt, dust and the like such as may be found under gasoline service station canopies and in industrial production zones; a generally weather-proof machine; a punch chip collector at the bottom of the machine which will automatically force itself open when full to become noticeable to be emptied; a novel readily operable variable data selection means whereby number indicia may be conveniently and readily observed while selecting a number and wherein a total amount of a sale transaction may be readily observed for accuracy; a novel construction of keybar elements for such variable data selection means wherein finger engagement portions are spaced apart and contoured in a particular manner so as to facilitate ease of selection of a particular number; a keybar arrangement which may be readily reset to correct an error before actuation and locked against change after initiation of actuation; a keybar arrangement which is automatically cleared for the next transaction upon completion of one transaction; and effective means for transferring such variable selection data to a punch block means.

Another very important advantage of the present invention is the provision of a separately movable card transport or carrier means for independently and separately receiving, holding, and orienting both a credit card and a sales slip with respect to each other and with respect to punch block means. The machine of the present invention is so designed and constructed that the transport carrier means is generally vertically disposed and a sales invoice may be introduced thereinto in a generally vertical plane. Thus pliant sales slip stock, which tends to droop or to bend downwardly when held in horizontal position is readily fed, aligned, and positioned in the vertically disposed carrier means with substantial control over the free end of the sales slip stock. The sales slip is guided along a partially curved path in such a manner that it will avoid contact with printing means at areas in which printing is not desired; the curvature of the sales slip being used to positively longitudinally orient the sales slip in the carrier means. A separate opening is provided for introduction of the credit card to the carrier means whereby the credit card and sales slip may be separately and independently inserted in the carrier means or whereby the credit card may be retained in the carrier means for repetition of certain data thereon if desired.

These and many other objects and advantages of the present invention will be readily apparent from the following description of the drawings in which an exemplary embodiment of the invention is shown.

In the drawings:

FIG. 1 is a front elevational view of a data recording machine embodying this invention with its card and record carrier means in position to receive a credit card and a sale slips.

FIG. 2 is a right side view of FIG. 1 with the card carrier means omitted.

FIG. 3 is a top plan view of FIG. 1.

FIG. 4 is a front elevational view with the card carrier means in operative punch position.

FIG. 5 is a plan view of a sales slip or data record adapted for use with the machine shown in FIG. 1.

FIG. 6 is a plan view of a credit card adapted for use with said machine.

FIG. 9 is a vertical sectional view taken in the plane indicated by line IX—IX of FIG. 8.

FIG. 10 is an enlarged fragmentary view of a portion of FIG. 9 showing the actuating handle in an intermediate position.

FIG. 11 is a back view similar to FIG. 8 showing the actuating handle and card carrier means in punching position.

FIG. 12 is a fragmentary sectional view taken in the vertical plane indicated by line XII—XII of FIG. 10.

FIG. 13 is a vertical sectional view taken in the plane indicated by line XIII—XIII of FIG. 8.

FIG. 17 is a transverse sectional view taken in the planes indicated by line XVII—XVII of FIG. 16.

FIG. 18 is a fragmentary sectional view taken in the plane indicated by line XVIII—XVIII of FIG. 8.

FIG. 19 is an enlarged fragmentary sectional view taken in a vertical transverse plane indicated by line XIX—XIX of FIG. 17.

FIG. 20 is a fragmentary back view of the variable indicia selector means.

FIG. 21 is a fragmentary side elevational view taken from the plane indicated by line XXI—XXI of FIG. 20.

FIG. 22 is a view similar to FIG. 21 showing the variable selector indicia bar in a selected position.

FIG. 23 is an enlarged fragmentary sectional view of the top end of an indicia bar shown in FIG. 22.

FIG. 24 is an enlarged fragmentary sectional view similar to FIG. 23 showing the cam release provided on the indicia bar.

FIG. 25 is a fragmentary sectional view taken in the transverse plane indicated by line XXV—XXV of FIG. 23.

Figure 7:
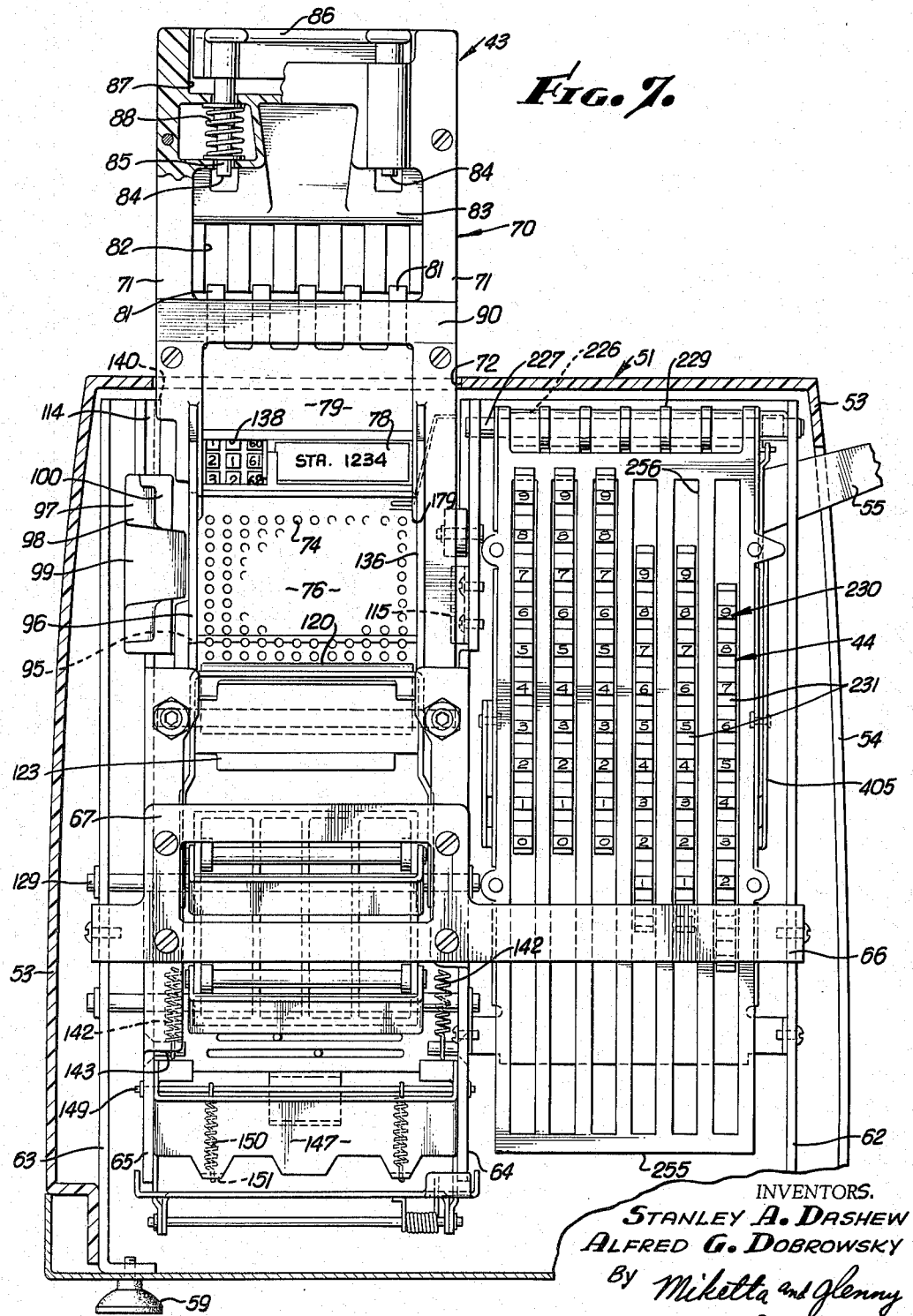
FIG. 7 is a front view of the machine shown in FIG. 1 with the front wall of the housing broken away.

A credit card 30 (FIG. 6) of any suitable rigid or semi-rigid metal, plastic composition, or any other suittable composition material may be provided with embossed information such as the name, address and account number of an individual and may also be provided with a plurality of holes and perforations 31 arranged in suitable machine code (such as Hollerith, numeric, binary, etc.) and also to provide for machine processing of the name, address and account number of the owner of the card. The card 30 may include other preselected information. While the card 30 is illustrated as being a credit card for use in source or "point of sale" sales transactions, it will be understood that card 30 may be any other form of perforated data-bearing card adapted for use in production control, stock control, credit, banking, billing, and other systems involving the handling and processing of data or information.

A data record means, sales slip, or invoice form 33 (FIG. 5) multipaged to provide a desired number of carbon copies for selected distribution and may include a portion 34 at which an operator may write the quantity, class and article of mechandise sold and the price. A line may also be provided for the customer's signature to acknowledge the items so listed. Adjacent sales slip portion 34 may be an identification portion 35 in which space is provided for the printing or stamping of the customer's name, address and account number as provided on the credit card 30. At the portion of the sales slip opposite the writing portion 34, a relatively stiff portion may be provided in which a plurality of prescored rectangular tabs 38 are arranged in grid fashion so as to provide a section 37a providing six columns of digits from 0 to 9 for identification of an account number, a section 37s providing three columns of like digits to identify a station code number, and a section 37d of six columns of like digit numbers to provide in code the amount of the sale transaction. Section 37s provides in code repetitive constant data, section 37a provides in code fixed data and section 37d provides in code variable data which may change according to the amount of the transaction. The portion of sales slip 33 which includes the portions 34 and 35 may be relatively pliant and flexible whereas the portion 37 which includes the coded data is preferably relatively stiff. The stiff portion 37 may be extended beneath the relatively pliant portions 34 and 35 to provide a stiff back for the sales slip.

Figure 14:
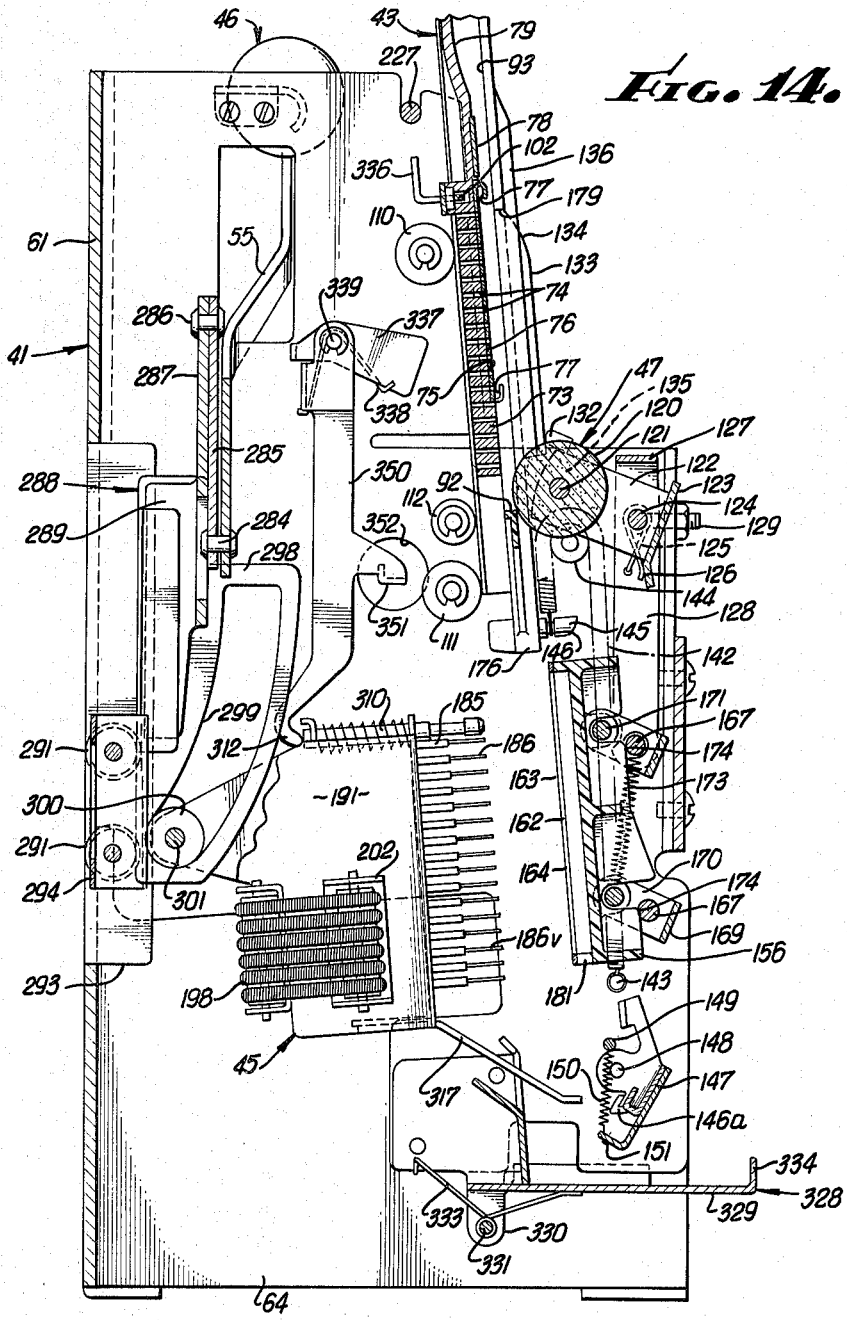
FIG. 14 is a vertical sectional view taken in the plane indicated by line XIV—XIV of FIG. 8.

In FIG. 1 is shown a machine generally indicated at 40 embodying this invention and adapted to receive and process the credit card 30 and the sales slip 33. Generally speaking, the machine 40 may comprise a housing and frame means 41 provided with an upwardly facing opening at 42 for generally vertical insertion into said opening of a card and record transport or carrier means 43. Variable data selector means 44 are provided in generally upstanding relation on the front face of the housing means in side by side relation to the carrier means 43. Within the housing is a punch pin block means 45 (FIG. 14) movable to a forward punching position and retractable to a non-punching position by an actuating means generally identified by 46. The housing means may also carry a printing means 47.

Housing and frame means 41

The housing and frame means 41 may comprise a housing 50 (FIGS. 1–4) of suitable material such as plastic composition having a relatively narrow inclined top wall 51, back wall 52, side walls 53, one of which may be slotted at 54 for downward vertical movement of the actuator arm 55, and a front wall or face 56 providing opening 42 and an adjacent inset vertically inclined front face portion 57 upon which the variable selector means 44 is arranged. The housing 50 may be associated with the internal frame means in any suitable manner and the frame means may be supported by four cushion pads 59. Consideration of FIGS. 1–3 shows a housing having a vertical dimension much greater than either of the horizontal width and depth dimensions. In FIG. 3 it will be apparent that a relatively small rectangular horizontal area will be occupied by the machine 40 when it is placed upon a supporting surface such as a counter or table.

The internal frame means may comprise a back wall 61 (FIGS. 14, 15) and a plurality of forwardly extending vertical laterally spaced outer walls 62 and 63 and inner walls 64 and 65 (FIGS. 7, 8, 11) said walls 64 and 65 generally defining a zone of movement of the carrier means 43 and the punch block means 45, while the space between walls 62 and 64 generally defines a zone for variable data selector means 44. Walls 62, 63, 64 and 65 may be interconnected at their front edges by a front transverse member 66 secured thereto in suitable manner. Front member 66 may be provided with an upwardly directed ported portion 67 extending between walls 64 and 65.

Card and record carrier means 43

The card and record transport and carrier means 43 (FIGS. 7, 8, 13, 14, 15) may comprise an elongated generally rectangular frame 70 of suitable plastic material having parallel side rails 71 movable in relatively close lateral alignment through opening 42 and an opening 72 in top wall of the housing. Secured between the side rails 71 and at the lower half of carrier frame 70 may be a metal grid block 73 provided with a plurality of vertical and laterally arranged rows and columns of perforations or holes 74. Perforated block 73 has a front face provided with a slight recess 75 (FIG. 14) receiving a credit card guide 76 having perforations aligned with the perforations 74 and having downturned and upturned horizontal edge lips defining guide grooves 77 for the credit card. Above the upper guide groove 77 a removable identification plate 78 bearing station data may be secured in a shallow complementary recess in block 73. Above plate 78 the front face of the upper extension of the metal block may be concavely formed as at 79 to provide relief or space to facilitate insertion and slight bending of sales slip 33. The top of concave face 79 terminates in a planar face portion 80 (FIG. 15) which may terminate in an upper edge portion provided with a plurality of laterally spaced parallel metal fingers 81, said fingers being aligned with parallel slots 82 provided in the upper half of the carrier frame 70 for permitting relative longitudinal adjustment of the metal block 73 with respect to the carrier frame for a purpose hereafter described.

Sales slip orientation

The upper half of carrier frame 70 may be formed with a transverse ridge member 83 adapted to outwardly bend the top portion of sales slip 33 so that the top edge thereof may be contacted by a bottom edge face 84 (FIG. 7) of each of a pair of biased depending pins 85 carried by a top sales slip orienting bar 86. Bar 86 interconnects pins 85 and in this example may be partially received within a recess 87 provided at the top of carrier frame 70. A spring 88 ensleeved over each pin 85 and carried within the upper portion of carrier frame 70 biases bar 86 into normally upward retracted position. A metal backing plate 89 (FIG. 15) may extend between the top of carrier frame 70 and the top portion of fingers 81 for rigidly reinforcing the upper portion of the carrier frame 70. Between the bottom edge faces 84 of pins 85 and a transverse member 90 interconnecting rails 71 is defined an opening 91 for insertion of sales slip 33 into carrier means 43 in a downward generally vertical direction.

A sales slip 33 inserted into opening 91 will be guided into close relation with the planar face portion 80 by transverse member 90 and the lower edge of the sales slip will then follow the concave surface 79, and pass over the plate 76 until the sales slip botom edge contacts a bottom transverse stop surface 92 (FIGS. 14, 15) extending between bottom portions of rails 71. Longitudinal edges of sales slip 33 are guided in side grooves 93 provided on internal side surfaces of rails 71 to accurately laterally orient the sales slip 33. When bar 86 is pressed down, pins 85 bearing against the top edge of sales slip 33 will compress said sales slip and cause accurate longitudinal orientation and positioning of slip 33 with respect to the carrier means 43.

Credit card orientation

Either before or after the sales slip 33 is inserted in carrier means 43, the credit card 30 may be inserted into a side opening 95 (FIG. 18) provided between a front cam rail portion 96 on rail 71 and a sidewardly projecting portion 97 of metal block 73. The metal portion 97 provides a pair of spaced guide aprons 98 for the credit card, a finger recess 99, and overlying lips 100 to facilitate inserting and removal of the credit card from the card plate 76.

A credit card 33 is accurately vertically oriented with perforations 74 by the guide grooves 77 and is accurately laterially oriented and held against an inner stop face 101 (FIG. 18) on the opposite rail 71 by a pivoted releasable arm 102 having a forwardly extending finger 103 at opening 95. An edge portion of card 30 may press against an ejector spring 104 as at 105 so that the card is positively held under pressure and positioned laterally between finger 103 and stop face 101 and spring 104. The arm 102 may be pivoted at 106 on block 73 and may be provided with a rearwardly extending end portion 107 adapted to be pressed forwardly as later described for releasing finger 103 from engagement with card 30 and for permitting compressed spring 104 to sidewardly eject card 30 at least a sufficient distance so that a finger inserted at recess 99 may readily remove card from the carrier means 43.

Carrier means 43 travel to punch position

Figure 15:
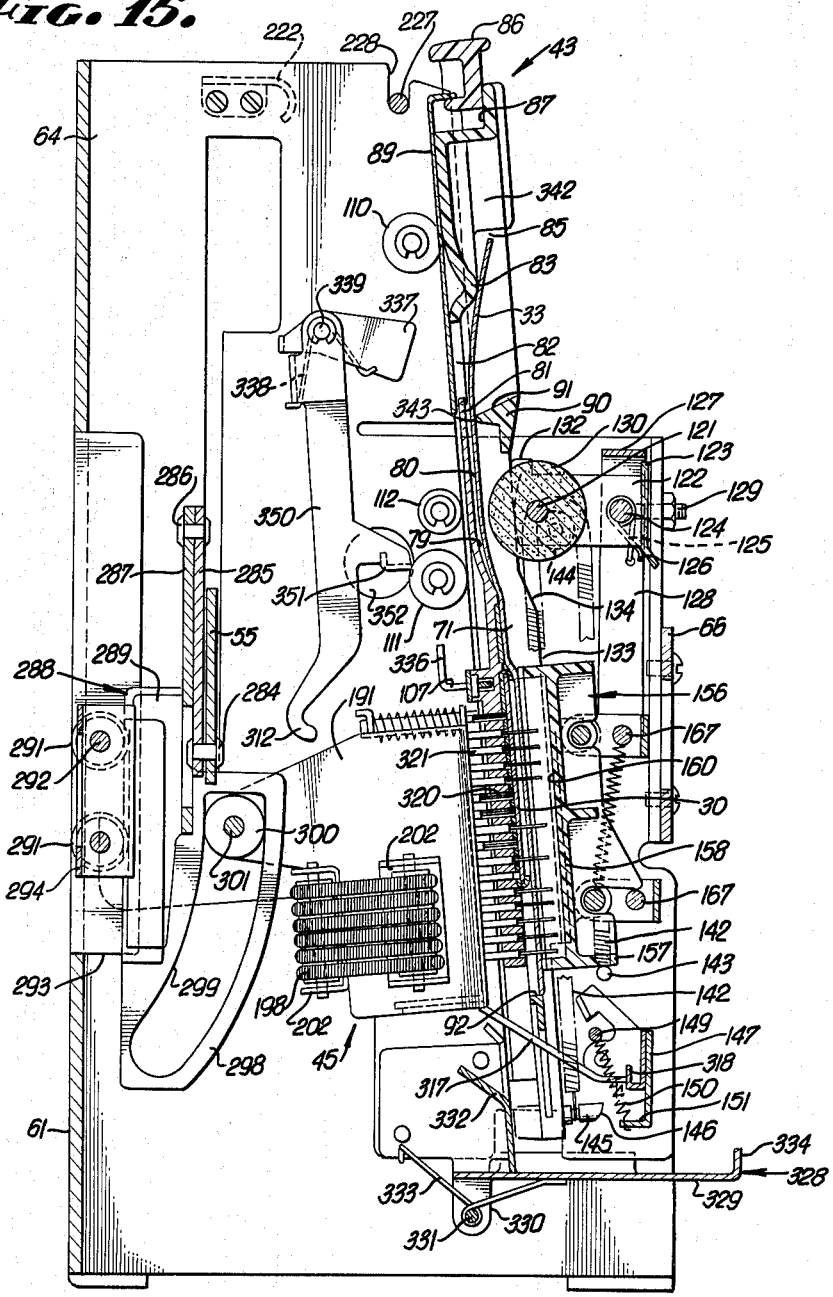
FIG. 15 is a vertical sectional view taken in the plane indicated by line XV—XV of FIG. 11.

After the sales slip 33 and credit card 30 have been inserted, oriented and positioned properly in carrier means 43, the carrier means 43 may be pushed downwardly to its position for a punching operation (as in FIG. 15). Means for guiding carrier means 43 during such downward movement between the walls 64 and 65 may comprise a plurality of vertically spaced pairs of top and bottom rollers 110 and 111 (FIGS. 8, 14, 15) carried on said walls 64 and 65 and having rolling engagement with back edge surfaces of the rails 71 of the carrier means 43. An intermediate pair of rollers 112 may be provided adjacent bottom rollers 111. A front guide clip 114 (FIG. 7) carried by wall 65 and a downwardly opposite guide clip 115 carried by wall 64 are slidable within longitudinally extending grooves 116 (FIG. 17) provided in outer edge faces of rails 71. Carrier means is thus positively guided in a planar somewhat forwardly inclined downward path between walls 64 and 65.

Printing means 47

As carrier means 43 moves downwardly, printing means 47 are provided for printing on the sales slip the embossed characters on the credit card and on the station identification plate 78. The printing means 47 may comprise an ink-carrying printing drum 120 (FIG. 14) carried on a shaft 121 mounted adjacent forward ends of spaced parallel legs 122 of a U-shaped member 123. Member 123 may be pivotally carried by a shaft 124 in spring biased relation therewith as by a spring 125 having one free end contacting the member 123 at 126 and its other free end anchored on inverted U-shaped vertically disposed strap member 127 having depending legs 128 provided with upper ports for receiving ends of shaft 124. The bottom ends of legs 128 are carried on a transverse support shaft 167 which is mounted on walls 64 and 63 and passed through a port in wall 65.

Means for controlling the spacing of inking drum 120 with respect to the sales slip 33 may be provided by a cam follower element 132 carried at one end of drum 120 on a leg 122. Cam element 132 slidably engages a cam track face 133 provided on rail 71 adjacent to wall 64. Spring 125 biases the member 123 so that the cam element 132 is normally pressed against the cam face 133. The printing roller 120 is thereby held in spaced relation to the sales slip 33 until cam element 132 and face 133 permits the printing drum to move toward credit card 33 at an inclined cam face portion 134 adjacent to the top of the card to press the printing drum against the sales slip and to thereby imprint embossed characters on card 30 and plate 78 on the face of the sales slip. After the cam element 132 moves off inclined cam portion 134, external circular heads 135 at each end of shaft 121 will engage top edge faces of tracks 136 provided on each rail 71, said tracks 136 defining a part for printing drum 120 whereby substantially uniform pressure printing engagement of the drum with the sales slip is provided. At final downmost position of carrier means 43, the printing drum is disposed opposite concave face 79 below member 90 and is in spaced relation to sales slip 33 (FIG. 15). A pair of adjustment screws bolts 129 limits the front position of member 123.

A cylindrical date stamp 138 (FIG. 7) may be provided adjacent plate 78, the date stamp bearing month, day and year character. The date characters are disposed at the same plate as the embossed characters on station plate 78 for simultaneously printing the sales slip with date and station identification. It will be understood that in place of a date stamp 138 other embossed characters may be selectively provided for indicating a sequence of numerical data in code or otherwise, if desired.

Carrier means 43 in punch position

As the carrier means 43 moves further downwardly from the above printing operation, it is ultimately stopped by contact of the upper edge 140 (FIG. 7) of the guide lip 114 with a rearwardly extending bottom face 141 (FIG. 11) at the top of outer rail 71. The carrier means 43 is normally biased toward its upper position by a pair of elongated coil tension springs 142 each having one end anchored to a laterally extending pin 143 carried by a respective wall 64, 65 adjacent the bottom thereof. Each spring 142 may pass over a pulley 144 on respective wall 64, 65 and may have its other end connected to a forwardly extending pin 145 carried at the bottom of each rail 71. The forward face of each pin 145 may be downwardly curved at 146 for cooperable sliding engagement with an upturned locking lug 146a carried at each end of a release bar 147 pivotally mounted at 148 to side walls 64 and 65. A transverse rod 149 carried by side walls 64 and 65 may support a pair of depending coil springs 150 connected at their lower ends to rearwardly projecting ears 151 on release bar 147. As the front faces 146 of pins 145 slide across the upturned locking lugs 146a of release bar 147 the bar is pivoted forwardly to permit the pins 145 to pass said lugs 146a and the springs 150 then return the release bar to its normal position with the lugs 146a overlying the tops of pins 145 as at 153 to temporarily lock and hold the carrier means 43 in its bottom position.

Punch board means

The punch means of the present machine, in addition to the punch pin block means 45, also includes a punch board means 156 (FIGS. 14, 15, 17) which acts as a female die for the punch pins and which is cooperably engaged by the lower portion of the carrier means 43 for positively longitudinally and laterally aligning the punch board means 156 with the punch pin means 45.

The punch board means 156 may comprise a rectangular peripheral frame 157 of selected depth interconnected by a transverse intermediate wall 158, said wall 158 being provided with a plurality of spaced reinforcing ribs 159 on its front surface. The wall 158 with frame 157 defines a chamber 160 for initially receiving tabs or chips punched out of sales slip 33. The back edges 161 of the frame 157 may support a plurality of vertically disposed parallel strips 162 of relatively hard unbending composition material to provide a back face 163 for supporting the front face of sales slip 33 in punching position (FIG. 15). The strips 162 define a plurality of longitudinal slits 164 which are laterally aligned with the perforations 74 in the metal block 73 of the carrier means 43.

Alignment of carrier means 43 with punch board means 156

Means for so aligning the perforations 74 with the slits 164 may comprise a relatively loose or sloppy lateral mounting of the frame 157 on a pair of vertically spaced support rods 157 carried by walls 64, and 63. Lock washers 168 (FIG. 17) at opposite ends of rods 167 provide relatively large or loose tolerance with walls 64 and 63 to permit limited lateral play of rods 167. Each rod 167 carries a laterally extending U-shaped member 169 having rearwardly extending legs 170 ported to receive rod 167 and connected to frame 157 by transverse reinforcing rods 171. Reinforcing ribs 159 may be relieved to accommodate rods 171. The punch board 156 is normally biased to an upper position by a pair of springs 173 each having a top end connected to upper support rod 167 and its bottom end connected to the lower rod 171. Thus the punch board means 156 is normally biased upwardly and is limited to such upward position by contact at 174 of the front edges of ribs 159 with rods 167.

As the carrier means 43 moves downwardly, diverging internal bottom faces 176 (FIG. 11) at bottom ends of rails 71 receive top corner portions of rectangular frame 157 and urge board means 156 slightly laterally so that external side faces of peripheral frame 157 may be guided into positive close sliding engagement with inner faces 177 provided on longitudinal ribs 136 on rails 71 (FIG. 17). Precise lateral relationship of board means 156 with the lower portion of the carrier means 43 is thus effected.

As the carrier means 43 moves still further downwardly relative to the upwardly biased position of board means 156, a pair of laterally aligned inwardly directed stop shoulders 179 provided on inner faces of rails 71 adjacent the top row of perforations 74 will abut the top corner faces of peripheral frame 157. Such abutting contact will cause the board means 156, with carrier means 43, to move downwardly about rods 167 until the carrier means 43 and the board means 156 are in their vertically and laterally aligned punching relation as shown in FIG. 15.

One of the purposes of biasing the board member 156 upwardly in the manner described above is to provide a machine-actuated shake or bumping means for causing punched out tabs or chips to fall through a plurality of openings 181 provided in the bottom wall of frame 157. Thus when the carrier means 43 is returned to upper normal position, the snapping of the block means 156 to its upwardly biased position will tend to shake and positively urge chips through openings 181 where they may be collected therebelow as hereafter described.

*Punch pin block means 45*

The punch pin block means 45 may comprise one group of a plurality of elongated cylindrical punch members 185 (FIGS. 16, 17) provided with reduced punch pins 186 at their forwardly directed ends for the reception into perforations 73. Each punch member 185 is provided with a collar 187 and is biased forwardly by a punch spring 188 against front perforated wall 189 of block means 45. A back wall 190 is provided with aligned perforations for guiding and supporting the back ends of punch members 185. The front and back walls 189 and 190 may be interconnected by side walls 191 each having a rearwardly directed extension 192 for cooperation with actuating means 46 as later described. The punch members 185, that is the upper rows, may be disposed opposite to credit card 30 when carrier means 43 is in punch position.

The arrangement of the lower six rows of punch members 185v is different in that only one punch member is disposed in a row and is movable laterally to a selected position in alignment with block 73 in accordance with data selected by the variable data means 44. Each of the punch members 185v may be carried by a laterally horizontally slidable block 195 disposed between lower portions of front and back walls 189 and 190. Each of said walls 189 and 190 may be provided with laterally extending parallel slots 196, edges of which are engaged by cylindrical portions of members 185v (FIG. 17). Punch member 185v is provided with a collar 187v to positively locate the member 185v between walls 189 and 190. The slots may extend laterally (FIG. 19) slightly more than the length of each horizontal row of members 185.

Each slide block 195 is biased toward one end of slot 196 by an elongated tension coil spring 198 having one end connected at 199 to block 195. Pairs of aligned sets of pulleys 200 may be supported on a pair of pulley shafts 201 each carried by a bracket 202 outwardly disposed of and secured to the outer face of side wall 192. Each spring 198 may be passed about a set of pulleys 200 and extended in laterally parallel relation to the back wall 190 of the punch block means for anchoring the other end of spring 198 on a vertically disposed anchor bar 203. Anchor bar 203 may be secured in vertically spaced angle shaped notches 204 provided in a rearwardly extending top lug 205 (FIG. 8) and a rearwardly extending horizontally disposed flange 206 on the back wall of the punch block means.

The selectively movable variable data punch members 185v may be connected with the variable data selection means 44 by a plurality of flexible dimensionally stable strong tapes 210 made of a suitable tape material such as "Mylar." Each tape 210 may be connected by a suitable slot and fastener means 211 at the end of slide block 195 opposite to the spring connection 199. Each tape 210 extends laterally through a port 212 in frame wall 64 to a cylindrical faced pulley 213 carried on a lateral extension 214 of the back wall of the punch block means which carries flange 206. Pulleys 213 are arranged along an inclined line so that tapes 210 may lie in parallel uniform spaced relation both horizontally and vertically as shown in FIG. 19. The end of each tape 210 may be connected as at 215 to a depending stem 216 of a yoke member 217 which provides mounting for a pulley 218 with its axis disposed at right angles to the plane of tape 210.

Each pulley (FIG. 9) is located at and in engagement with the bottom end of a loop of a tape 220 of a material similar to tapes 210. One end of tape 220 may be anchored as at 221 to a transverse member 222 (FIG. 11) secured to walls 62 and 64 adjacent their top edges. The transverse member 222 may be provided with a convex front face 224 guidably supporting the fixed end portion of tape 200. The loop formed by tape 220 is further defined by a top tape pulley 226 carried on a pulley shaft 227 having opposite ends retained in upwardly facing notches 228 provided in top front edge portions of walls 62 and 64. Pulley spacer washers 229 hold tapes 220 in selected parallel relation at the top of the variable data selector means.

Each tape 220 may pass over a pulley 227 and then downwardly along the front face of the variable data selector means for connection to data selector key bar means 230.

*Variable data selector means 44*

Variable data selector means 44 comprises a plurality of the key bar means 230 each connected to a tape 220 for selectively moving the associated punch member 185v. In this example six key bar means 230 are provided in generally upstanding rearwardly inclined parallel relation. Each key bar means 230 (FIG. 9) includes a front elongated key bar member 231 of plastic composition material and an elongated metal strip-like back member 232.

Means for connecting one end of tape 220 to a key bar means 230 may comprise an enlarged rectangular button 234 (FIG. 23) provided on the end of tape 220 and held within a lateral slot 235 adjacent the upper front edge of the back member 232. Button 234 is also received loosely within an elongated longitudinally extending slot 236 provided in the back top portion of key bar member 231 so that there may be provided longitudinal relative movement between the back member 232 and the front key bar member 231 as later described. A slit 237 between the back face of the key bar member 231 and the front edge of the back member 232 receives the adjacent portion of the tape 220.

Key bar members

Figure 8:
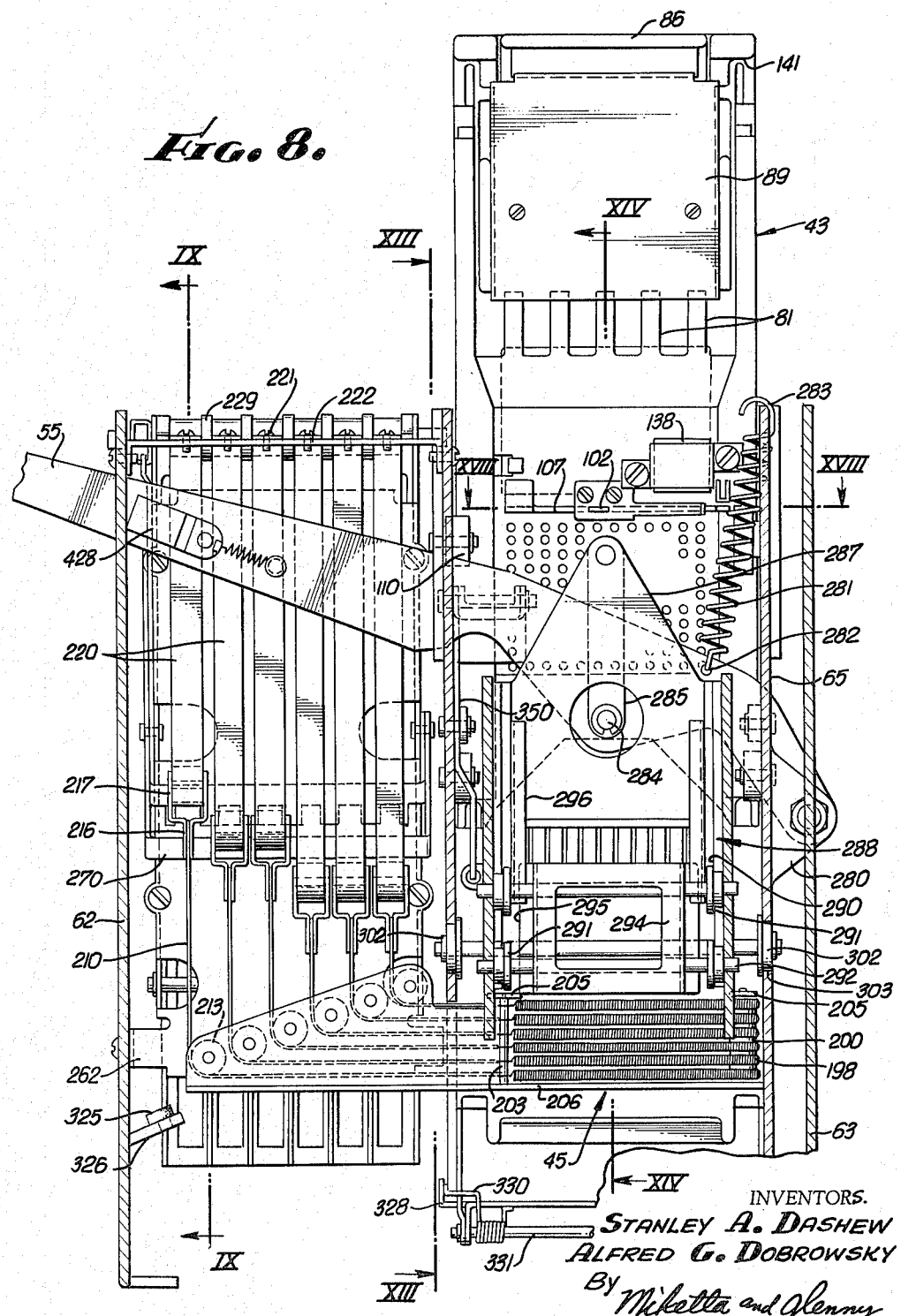
FIG. 8 is a back view of the machine shown in FIG. 1 with the housing removed.

The front key bar member 231 may be of generally elongated rectangular shape and of uniform width throughout its length. From the front face of key bar member 231 extend a plurality of longitudinally spaced angle-section projections 239 providing therebetween finger receiving recesses 240, each recess being defined by an upper inclined face 241 on a lower projection 239 and by a bottom inclined face 242 of an upper projection 239. The angle of inclination of faces 241 and 242 are particularly selected and the distance between the said faces at each recess 240 is such that a finger received within said recess 240 is comfort-positively accommodated so as to permit a convenient positioning of the hand of the operator for actuating the key bar means 230. The faces 241 on each key bar means 230 may be imprinted or stamped with indicia, data, or digits from zero to nine as shown in FIG. 7. The indicia are readily viewable because of the inclination of key bar means 230 and because of the angular disposition of faces 241.

The key bar member 231 provides a back longitudinally extending groove or slot 245 for receiving a forwardly extending body portion 246 of the back member 232, said portion 246 being of substantially less length than slot 245 (FIG. 9) to permit longitudinal relative movement of key bar member 231 and back member 232. The slot 245 is enlarged laterally at 246 (FIG. 25) to provide a plurality of longitudinally spaced camming faces 247 (FIG. 23) lying between parallel edges 247 defining the back face of the key bar member 231. The back edge of the member 232 is provided with a plurality of longitudinally spaced ratchet teeth 250 having engagement faces disposed perpendicular to the longitudinal axis of member 232. When key bar member 231 and the member 232 are in normal relative positions (FIG. 23) the springs 198 which bias the tapes 210 and 220 will position ratchet teeth 250 with respect to the camming faces 247 so that camming faces 247 lie below the engagement faces of ratchet teeth 250. A ratchet dog or pawl 252 is releasably engageable with ratchet teeth 250 when it is desired to change or reselect a digit on the key bar means by simply urging the key bar member 231 upwardly so that the camming faces 247 move upwardly relative to the ratchet dog 252 and ratchet tooth engagement face so as to cam the dog 252 out of engagement with the ratchet teeth. It will be apparent that dog 252 will be sequentially cammed out of each of the ratchet teeth as the key bar member is moved upwardly. When a selected indicia has been positioned at the bottommost row of faces 241, the tension of spring 198 will cause the key bar member 231 and member 232 to return to normal relation (FIG. 23).

It is important to note that the arrangement of the loop of tape 220 with the tape 210 to produce a predetermined movement of the variable end 185v into precise selective position with respect to the punch block means permits accurate positioning of the pins. The loop multiples by 2 the distance which the key bar moves in the selection of an indicia in order to produce correlated movement of the variable pin 185v. Thus the spacing of the ratchet teeth is twice the interval which would be required if there was a direct connection between tape 210 and the end of key bar means 230.

Key bar members support

The key bar members 231 may be supported in parallel relation by an elongated rectangular bar frame member 255 provided with longitudinally extending parallel slots 256 (FIG. 6, 10, 25) each having a length approximately twice as great as the length of key bar member 231, said slots receiving the key bar member 231 as shown in FIG. 25. Longitudinally extending stiffening ribs 257 provided between slots 256 define parallel guide lips 258 which may slidably engage at 259 forwardly facing shoulder faces on key bar member 231. The back edge faces 248 of key bar member 231 may also slide on a front face of a back wall 260 secured to the frame 255 in any suitable manner as by screw bolts 261 (FIG. 21). Wall 250 may be provided with laterally extending lugs 262 for securement of the frame 255 and back wall 260 to the vertical frame walls 262 and 264 (FIG. 20). The back wall 260 may be formed of sheet metal and may include side wall edge portions 263, 264 and 265 which receive therebetween the frame 255 and which may be provided with ports at their top ends for reception therethrough of pulley shaft 227. Between the upper side wall portions 265, back wall 260 may be provided with an inturned portion 266 (FIG. 9) providing a top stop for limiting upward movement of key bar members 231. External side ribs 257 of frame 255 may also be provided with ports for pulley shaft 227 for connecting frame 255 with the walls 62, 64.

Key bar holding means

Means for holding a selectively positioned key bar member 231 in position to indicate a selected data or amount may comprise the ratchet dog 252 having a forwardly extending tooth engagement portion 270 (FIG. 20, 21) having a front face inclined at approximately the same angle as the back faces of the camming teeth 247 on the key bar member 231. Each dog 252 is pivoted on a transverse shaft 271 carried by rearwardly extending side lugs 272 formed from back wall 260. Each ratchet dog 252 is biased forwardly by a spring 273 having a top loop engaged in a notch 274 provided in the back edge of ratchet dog 252 and having free ends 275 bearing against back wall 260. The intermediate portion of spring 273 may bear against the shaft 271 as at 276. A plurality of ratchet dogs 252 are thus mounted in corresponding relation to key bar members 231 to act individually for setting a member 231 and capable of being released either individually or all simultaneously as a unit from engagement with the ratchet teeth as later described.

It will thus be apparent that by placing a finger on a selected digit and moving the key bar downwardly until the upwardly inclined surface 278 of the front cover is reached, further downward movement of the key bar will be prevented because of such cover and a variable punch member 185v will be selectively positioned.

Just above the top surface of face 278 will appear digits representing the amount selected. After having selected the amount of the sale transaction and having moved the carrier means 43 into punch position, an operator has prepared the machine for a punching operation.

Punch actuating means 46

Actuating means for a punching operation includes a hand knob at one end of actuating arm 55, said arm 55 being pressed downwardly in one continuous stroke to the bottom of slot 54. Actuating arm 55 is shown in normal upper biased position in FIG. 8 and extends diagonally across and downwardly with respect to the back of the machine. At its remote opposite end, arm 55 is pivotally connected to a sidewardly extending lug 280 stamped out of wall 65 and extending partially into an opening provided in wall 63. Intermediate its ends the arm 55 is biased upwardly by a relatively heavy coil spring 281 connected at its lower end at 282 to arm 55 and at its upper end at 283 to wall 65. Centrally between walls 64 and 65 the arm 55 may be provided with a pivotal connection at 284 with an upwardly extending link 285 which is pivotally connected at its upper end at 286 with an upstanding extension 287 of an actuating carriage 288. Carriage 288 (FIG. 14) comprises a pair of parallel side members 289 provided with parallel vertically extending guide grooves 290 which receive successively pairs of guide wheels 291 carried by a pair of spaced shafts 292 supported in forwardly extending portions 293 stamped from the back wall of the frame. Each shaft 292 may support between a pair of wheels 291 a relatively loosely laterally movable ported plate-like members 294 having side lip portions 295 adapted to slidably cooperate in guiding relation with inwardly extending ways 296 provided on the side members 289. Thus carriage 288 is positively guided for vertical movement along back wall 61 as downward motion is transmitted thereto by actuating arm 55.

The carriage 288 includes on each side wall 289 a forwardly extending portion 298 (FIG. 14) providing an upwardly and forwardly curved slot 299 for guiding wheels 300 along said slot when the actuating arm drives carriage 288 downwardly. The wheels 300 are carried on an axle 301 which extends beyond portions 298 to support at its opposite ends a pair of wheels 302 held within and guided for rolling engagement with forwardly slightly upwardly inclined slots 303 provided in frame walls 64 and 65. The rearwardly extending extension 192 of the side wall of the punch block means 45 is disposed in proximate relation to the walls 64 and 65 and each extension 192 is ported for connection with axle 301. Forwardly of the pair of wheels 302, the side walls 191 of the punch block means may carry a forward pair of wheels 304 having rolling engagement with a slot 303 in a manner similar to the wheels 302. A stub shaft 305 for each of the front pair of wheels 304 may serve as a connection for one end of a spring 306 which may be connected at its opposite end to the respective frame walls 64 and 65 as at 307 for normally biasing the punch block means 45 into a rearward retracted position. Thus slots 303 define a path of travel for the punch block means normal to the plane of the block 73 on carrier means 43 and the curved slots 299 and wheels 300 carried by axle 301 provides a positive means for translation of vertical movement of actuating arm 55 into forwardly directed movement of punch block means 45.

*Punch block alignment means*

Figure 16:
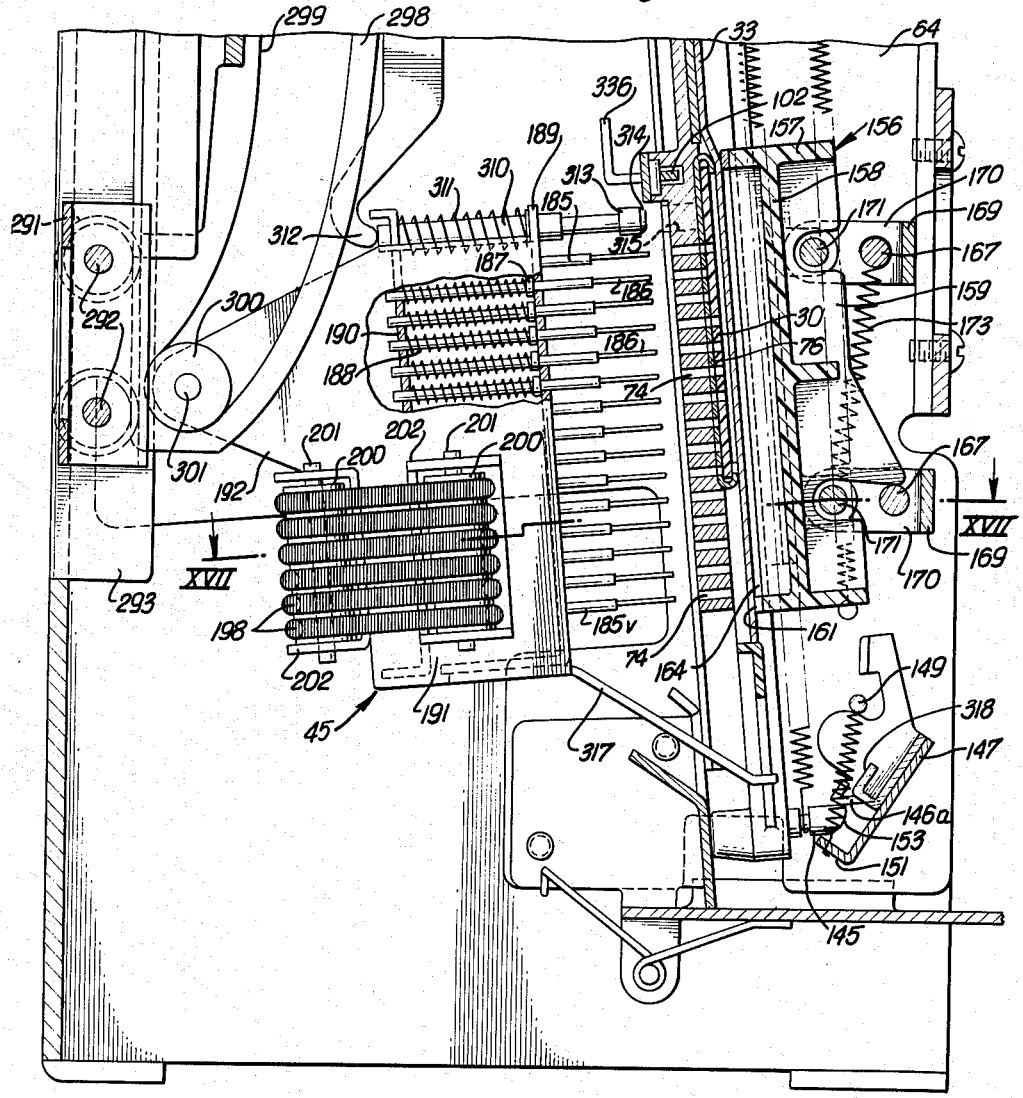
FIG. 16 is an enlarged sectional view taken in the same plane as that of FIG. 15 and showing the punch means in retracted position.

As actuating arm 55 is pressed downwardly (the carrier means and key bar means have have already been positioned) the punch block means 45 is moved toward the carrier means 43 and the punch board (FIG. 16). Means for guiding the punch block means 45 into precise relationship with punch members 185, 185v aligned with the perforations 74 in the grid block 73 may comprise an alignment pin 310 projecting from the upper inner corner of the front wall 189 of the punch block, said alignment pin 310 being biased with spring 311 seated between the front and back walls 189 and 190 of the punch block frame. Alignment pin 310 projects from the back wall 190 for engagement with a follower finger 312 whose purpose will be hereafter described. A headed front end 313 of pin 310 may be beveled at 314 to facilitate seeking and direct alignment with a bore 315 provided in grid block 73. The opening to bore 315 is spaced rearwardly of openings of perforations 74 so that headed end 313 of the alignment pin 310 may positively align the pin block means 45 with the grid block 73 before the pin elements 186 enter the perforations 74.

Jut before precise alignment of punch block means 45 and the grid block 73 is achieved, alignment pin 310, which is rigid, will serve to positively hold the carrier means in its down position because of reception of the headed end 313 in bore 315. After pin 310 has become thus engaged in bore 315, a forwardly extending release foot 317 carried by the bottom wall of the punch block frame moves against central rearwardly spaced abutment face portion 318 of carrier release bar 147. Thus, as the punch block means 45 is driven forwardly, the carrier means 43 is automatically released from its interlocking engagement with the pins 145 carried by carrier means. The release bar is pivoted about axis 148, and the foot 417 holds bar 147 in released position.

With punch members 185 now in alignment with the perforations 74 the punch block means 45 can be further advanced by further downward movement of the actuating arm 55. As the pin elements 186 enter perforation 74 some elements 186 will contact the credit card 30 as at 320 (FIG. 15) while other elements 186 will pass through ports 31 on the credit card as at 321. Pin elements 186 which pass through the ports 31 are urged further forwardly by downward movement of the actuating arm and punch out the prescored rectangular tab 38 opposed thereto on sales slip 33. It should be noted that the sales slip is supported or backed by the face 163 of punch board and that pin elements 186 are relatively small in cross section as compared with the area of a tab 38. Thus a relatively narrow pin element 186 may readily push the prescored tab between the slits 165 in the punch board and move the tabs into the chip or tab chamber 160 (FIG. 17).

The selected punch members 185v similarly are moved forwardly through aligned perforations 74 in the grid for punching out an opposed tab 38 in the portion 37v of the sales slip 33 to represent the amount of the sale in code.

A punching operation completed as described above positions actuating arm 55 at the bottom of its stroke and with its bottom edge seated against a cushion pad 325 carried by a lug 325 (FIG. 8) struck out of wall 62. The carriage 288 is at its lowermost position and punch block means 45 is at its forwardmost position. The pins 186 and 186v which have passed through the holes in the credit card and have pushed out the prescored tabs in the sales portion 37 have thus transferred to the sales slip 33 all of the coded information on the credit card 30 as well as fixed or station identification in code provided on block 73. In this respect, it may be noted that the sales slip portion 37d is disposed at the bottom portion of block 73 for cooperation with the variable data pins 186v. In this example, the fixed or station data indicated at 37s on the sales slip 33, may be provided directly above the lower six rows of variable data pins 185v. In order to factory-set coded information in the pin block 73, the credit card guide plate may be selectively perforated at the fixed data zone so that only those pins 186 which are opposite such coded perforations, will pass through block 73 and into punching relation with the sales slip 33.

*Release of punch actuating means*

Upon release of the punch actuating means 41, as by permitting the actuating arm 55 to return to its normally biased upward position, it will be apparent that the various parts described above will operate in virtually reverse procedure or order. As actuating arm 55 is permitted to move upwardly, the pins 186, 186v are withdrawn from the slits 164. Such withdrawal tends to wipe from the pins any prescored tabs which have been punched out of the sales slip, and such removed tabs 38 fall to the bottom of the chamber 160 and through the openings provided therein and ultimately into a chip collector container 328.

During the release operation, it will be noted that the actuating arm 55 returns to its top position before the carrier means 43 is released from its engagement with alignment pin 310. The punch block means 45 is steadily retracted rearwardly and the punch members 185 and 185v are completely withdrawn from the metal block 73 before the alignment pin 310 is disengaged. Since the release bar 147 has already been actuated, the carrier means 43 is held until the headed end of the alignment pin 310 is withdrawn from the bore provided in the metal block 73. At this moment, the upwardly biased carrier means 43 begins to move upwardly because of the bias of the springs 142.

As carrier means 43 moves upwardly, the punch board likewise moves upwardly under the biasing force of the springs 173. Since the upward movement of carrier means 43 is rapid, the punch board means 169 is snapped to its upper position and such snapping tends to further dislodge and shake out punched-out tabs 38 in the chamber 160.

As the carrier means progresses upwardly, the printing means 47 is moved into its normal retracted position by cam tracks 133 and 136.

Credit card release

Means to automatically release and partially eject credit card 30 as the carrier means reaches its topmost position is provided by sliding contact of an upstanding lug 336 (FIGS. 18 and 14) which slidably engages a forwardly extending downwardly inclined pivotally mounted biased arm 337 which turns lever 102 about its pivot axis 106 to retract finger 103 and to permit spring 104 to eject credit card 30 through opening 95. The arm 337 is biased upwardly by a spring 338 carried on pivot pin 339. Credit card 30 may be at least partially ejected through opening 95 so as to facilitate grasping the outer edge portion thereof for complete removal of the credit card.

It will be understood, of course, that in some processing operations a coded card may be desired to be retained in carrier means 43 for a selected number of repetitive operations. Suitable means (not shown) may be provided for making the arm 337 inoperative, so that no release pressure force will be applied against lug 336.

Sales slip release

When the carrier means 43 is at its topmost position, the sales slip 33 may be readily withdrawn from the opening 91. To facilitate grasping of the top of the sales slip 33, the upper portion of carrier frame 70 may be provided with a front facing central recess 342. The transverse rib 83 positions the top edge of the sales slip slightly forwardly to further assist in grasping of the sales slip. In FIG. 15 it may be noted that as the sales slip 33 is withdrawn, the relatively sharp edge 343 of transverse member 90 will tend to scrape and to smooth any edges of openings formed by punching out of the prescored tabs 38. Thus the edge 343 further cleans and smooths the exposed edges of the openings from which tabs 38 have been punched. With the sales slip 33 removed from the carrier means 43, the carrier means 43 is in condition to receive a second sales slip. With credit card 30 ejected from its opening, the carrier means 43 is ready to receive another credit card for a succeeding operation.

Chip collector

The chip collector container 328 may comprise a bottom transverse wall 329 having a depending lug 330 adjacent its inner side edges for pivotal connection with a transverse rod 331 carried by frame walls 64 and 65. An upstanding rearwardly inclined back wall 332 is disposed just rearwardly of the planar zone of the carrier means 43. A spring means 333 may be carried by rod 331 for biasing the bottom wall 329 to a normal upper horizontal position. At the front edge of wall 329 may be provided a finger tab 334 to facilitate downward pressing of container 328 when it is desired to empty the container of tabs 38. Chips or tabs which fall from chamber 160 will be collected by container 328; as they accumulate without emptying of the container 328, the container will be gradually pressed down by such accumulation of tabs until the tabs overflow and the fact that the container is full will become noticeable. Such collection of tabs 38 in container 328 does not interfere with the operation of the carrier means 43 because as the carrier means is pressed downwardly each time, any such accumulation would be urged downwardly and the container 328 would also be urged downwardly.

Interlock means

Interlock means are provided between the carrier means 43, the variable data selector means 44, and the actuator means to assure proper sequence of operations and to prevent damage to parts of the machine. The interlock means are also keyed to movements or positions of actuating arm 55, punch block means 45, of the carrier means 43, and of clearing of the key bar means for a next operation.

One of the first operative interlock means is shown in FIG. 18. A credit card 30 must be properly positioned in carrier means 43 before the carrier means can be moved downwardly. This condition is required by a rearwardly projecting stop element 103a on arm 102, said stop 103a having abutting contact with a stop lug 103b on wall 63 just below element 103a when carrier means 43 is in uppermost position and when a card 30 prevents finger 103 from assuming its normal biased position across opening 95. When card 30 is in proper position, stop element 103a will pass lug 103b as shown in FIG. 18. Thus neither the carrier means 43 nor the actuating arm can be moved unless the credit card is properly inserted.

When actuating arm 55 is in upper position and the punch block means is retracted, the back face of alignment pin 310 contacts the finger 312 carried by a depending lever 350 pivotally connected at its upper end to pin 339 carried by wall 64. Intermediate its ends lever 350 is provided with a projection 351 which extends laterally through a port 352 provided in wall 64 and into the zone where the variable data selector means is operable. The lateral portion 351 may contact as at 354 (FIG. 13) the forward face of a forwardly extending leg 355 of a lever member 356 pivotally connected at 357 intermediate its ends with wall 64.

Pivotal connection 357 may comprise a pin having cooperable engagement with a horizontal slot 358 provided in an interlock bar 359 guided for reciprocal movement by a second pin and slot connection at 360 on wall 64. The interlock bar 359 may be provided with a depending lug 361 forming a connection for one end of a spring 362 connected at its other end at 363 to member 356 for biasing the interlock bar 359 rearwardly. The front edge 365 of bar 359 may contact the upper edge of an elongated bar 366 having vertically spaced pin and slot guide means 367 on wall 64 and biased by a spring 368 into upper position. The lower end of bar 366 may carry a lateral projection 369 which may be engaged by the bottom portion of rail 71 as the carrier means 43 is moved downwardly to permit the bar 366 to be moved downwardly and permit the interlock bar 359 to move forwardly to override the top edge of bar 366. Thus until the carrier means 43 is in its downmost position the interlock bar 359 will be held against forward movement and the back end of the bar 359 is in the path of downward movement of actuating arm 55, and will thus prevent operation of the machine.

Another interlock means requires that the ratchet or latch dogs 252 be free and unlocked before the means to clear the variable data selector means becomes operative. The latch dogs 252 and their engagement with key bar means 230 are best seen in FIGS. 13, 21, 22. In FIG. 21 the key bar members 231 are illustrated in raised nonset position, while in FIG. 22 one of the key bars is illustrated in set position. The manner in which a key bar 231 is selectively moved downwardly to select a number has been described above. A latch interlock bell crank lever 370 may be pivotally mounted on wall 64 at 371 and has an upstanding leg provided with a front projection 372 for contact with wall 354 of leg 355. The top end of the upstanding leg 370 may contact as at 373 the depending lug 361 on the horizontally movable interlock bar 359. The forwardly extending leg 374 of lever 370 may carry at its forward end a transverse bar 375 which may extend behind the plurality of latch dogs 252 in locking relation therewith. A spring 376 is connected at its top end with the bar 375 adjacent leg 374 and at its bottom end at 377 with a bracket 378 projecting from wall 64. The spring 376 biases the bell crank 370 downwardly or forwardly. Thus when bell crank 370 is in forward position not only will the dogs 252 be locked and key bar 231 held against movement, but the interlock bar 359 will be moved forwardly to clear the actuating arm path.

A key bar position sensing member 380 (FIG. 20) may be pivotally connected at 381 to the key bar frame 255 and may be biased forwardly by a leaf spring 382 suitably secured and carried by back wall 260. The sensing member 380 is provided with a plurality of transversely spaced downwardly extending sensing fingers 384 which may bear against a tapered surface 385 provided at the bottom end of each key bar member 231 when in non-set position.

Thus when a key bar member 231 is first moved to a selected indicia position, an upwardly extending pivoted lever 386 connected with bar 384 at one side of frame 255 has its bottom end moved rearwardly to the position shown in FIG. 22. The lever 386 is pivotally connected at 387 to a rearwardly projecting lug formed on the key bar frame and the top end of lever 386 is provided with a port 388 which interlocks with a rearwardly and laterally extending projection 389 provided on an indicator member 390 pivotally mounted on shaft 227. The top face 391 of said member 390 may be colored and may appear in a window in the housing to indicate a key bar member has been moved to a selected number. The member 386 provides a rearwardly projecting lug 392 below port 388 for pivotal connection at 393 of a hairpin-like member 394 which may be biased forwardly by a coil spring 395 having its forward end connected at 396 to the lever 386 just below port 388. The bottom face 398 of member 394 seats as at 399 on a hump located between the two scalloped or concave surfaces 400 and 401 provided in a member 402 pivotally connected at 403 to the top end of a gang latch dog release lever 405 also pivotally connected to the key bar frame at 387. The member 402 may be biased by a spring 406 connected at one end at 407 to a hook-shaped end of member 402 and at its other end to a downwardly turned hook-shaped portion 408 provided on lever 405 forwardly of the pivotal connection 387.

Thus when the first key bar member 321 is pressed downwardly and after or before a punching operation, the forward movement of the top end of the lever 386 caused by the backward movement of the tab 384 onto the furthermost back surface of the key bar member 231 causes the hairpin member 394 to rock over the hump at 399 and to assume a position as shown in FIG. 22. The member 394 thus presses against the forward face of the hump and tends to urge the member 402 downwardly about its pivotal connection to the top end of the lever 405 and causes the member 205, which carried the gang release bar 410, to move forwardly and thus permit each of the latch dogs 252 to be biased into engagement with associated teeth on each of the key bar members as selected by the operator. The gang bar 410 is thus made inoperative upon selection of a number on any key bar member 231.

When the actuating arm 55 is pressed to its downmost position for the punching operation and then is released to return to its uppermost position, latch dogs 252 must be capable of being released from the interlock member 375 before the gang release bar 410 is actuated to clear the selector means. To facilitate such prior release of gang release bar 410, the top end of member 356 (FIG. 13) may be provided with a cam element 412 pivotally mounted as at 413 on member 356 and biased by a spring 414. The cam element 412 is provided with a cam edge 415 which is interposed in the upward path of movement of actuating arm 55 when the latch dog interlock bar 375 is in locking position as shown in FIG. 22. Thus as the actuating arm 55 moves upwardly and contacts the cam edge 415, the top end of the member 356 is moved forwardly about its pivotal axis at 357 and causes retraction of the wall 354 which is engaged by the projection 372 on the bell crank interlock lever 370 and thus forcibly causes the bell crank lever 370 to rotate about its pivotal connection 371 so as to withdraw the bar 375 from its forward locked position with respect to the latch dogs 252. It will thus be apparent that the latch dog interlock bar 375 is moved to release position.

When bar 375 is released the key bar members 231, under strong biasing forces from springs 198, are driven upwardly and the latch dogs are pressed by gang release bar 410 out of the ratchet teeth on the back of the key bar members. The gang release bar 410 is urged against the dogs 252 by the spring 406 and when all of the key bars have returned to upper position, the lever member 386 will pivot its top end rearwardly and the hairpin member 395 with member 402 will reset their contact at the hump as shown in FIG. 21. The variable data selector means is then set and cleared for the next operation.

It should be noted that in operation of the machine above described, the actuating arm 55 cannot be pressed downwardly until a number has been set on the variable data selector means. This is accomplished by a forwardly extending lug 420 (FIG. 12) provided adjacent the frame wall 63 on actuating arm 55 for abutment as at 421 with a rearwardly extending portion 422 of the lever member 386. Thus the device is not operable to move the punching block means 45 forwardly unless a number has been set into the machine.

It should be noted that if a key bar member 231 is not properly set for a selected number, that is, number 231 is located between numbers 3 and 4, for example, the arm 55 cannot be actuated because interlock bar 359 cannot move sufficiently forward to clear arm 55. Under such condition the associated latch dog 352 will not seat fully in its respective ratchet tooth and will be rearwardly disposed to interfere with downward biased movement of transverse member 375 which is required to release interlock bar 359. Thus variable data must be properly set into the machine to permit actuation of arm 55.

*Anti-backup means*

As shown in FIG. 22 when at least one key member 231 has been set to an amount selected, the member 386 is moved forwardly and the portion 422 is moved forwardly so that the actuating arm 55 may pass downwardly to perform a punching operation. Once the actuating arm has passed the portion 422, means are provided to prevent back-up of the actuating arm unless a full down stroke is completed. Such means include vertically spaced notches 425, 427 and 427 provided in the back edge of the slot in which the actuating arm moved. The actuating arm 55 may be provided with a pivoted lock element 428 (FIG. 12) having a pivotal connection at 429 to the actuating arm 55 and biased by a spring 430 to a position normally parallel with the arm 55. The end of the lock element 428 rides on the interior surface of the wall 62 adjacent a slot 54a (FIG. 9) provided in frame wall 62. Thus as the actuating arm 55 is moved downwardly, the lock element 428 may successively snap into notches 426 and 427 and if the downward movement of the arm 55 is stopped, the lock element 428 will prevent the arm from moving upwardly. At the bottom of the arm stroke, the wall 62 may be provided with an enlarged notch 432 which permits the lock element 428 to return to its normal biased position parallel to arm 55 so that when the arm is released the lock element 428 will be disposed in a downwardly inclined fashion and will override the notches 427 and 426.

Such an anti-backup means is necessary because when the lock element 428 is in engagement with the notch 426, the downward movement of the actuating arm 55 has moved the punch block means 45 forwardly into engagement with the metal block 73 and the alignment pin 310 is in cooperative engagement with the alignment bore in the block 73. Thus further variable data selection resulting in changes of position of punch members 185v is prevented and the punching operation must be completed. The top notch 425 is of sufficient width so that the locking element 428 may reverse its position for the succeeding down stroke of the actuating arm 55.

From the foregoing description it will be understood that the actuating arm 55 cannot be moved downwardly until a number is selected; that once the arm begins its down stroke it cannot be returned to starting position until the down stroke is completed; that on the up-stroke of the actuating arm means are provided to automatically clear or return the variable data selector means to original starting or non-set position and ready for the next operation; that the carrier means 43 will not move from punch position to upper position until the punch members are clear of the carrier block 73; and that the sales slip 33 and credit card 30 may be fed to the machine independently and in any sequence. Other advantages, modifications and safeguards in the operation of the machine will be apparent to those skilled in the art and only some of such modifications are mentioned.

*Fixed data modification*

The positions of the punch block means 45, a punch board means opposite thereto, metal block 73, and the carrier frame 70 may be so arranged that relative longitudinal displacement of metal block 73 with respect to the carrier frame means 70 may dispose the metal block 73 in a relative upper position as compared to that shown in FIG. 15 for changing or enlarging the range of coded fixed data. When metal block 73 is so repositioned upwardly about three rows, the lower three rows of the variable data punch members 185v will not pass through perforations 74 in the lower three rows of block 73, but will move directly into punching engagement with the prescored sales slip 33. Thus above the top row of variable data punch members 185v there may be provided a set of three or more rows through which pins 186 may pass for transferring stationed or fixed data. A selectively perforated blank plate (not shown) may be attached over the set of said rows in block 73 for permitting transfer only of a selected fixed code to the sales slip. Other means may be used for modifying the fixed code data in the factory or in the field. Moreover, such reorientation of metal block 73 with respect to the punch block means 45 will not affect the transfer of the coded information as long as the credit card or sales slip are properly oriented and positioned relative to one another.

It should also be noted that the carrier means 43 is arranged so that a multi-page or leaf sales slip 33 may be so disposed in the carrier means that certain of the pages are not stamped or printed by the printing means. This may be simply done by holding the selected leaves outwardly as the sales slip 33 is inserted into the opening 91 and the selected leaves may lie outside of the transverse member 90.

All changes and modifications coming within the spirit of this invention and within the scope of the claims append hereto, are embraced thereby.

We claim:

1. In a data recording machine for a perforated data-bearing card and a data record slip having prescored tabs comprising: a carrier means movable in a selected path; means on said carrier means for positioning a data card; means on said carrier means for positioning a record slip in face-to-face relation with said card; a punch block means provided with a plurality of punch members and movable toward the path of the carrier means; means for guiding said carrier means into a position in punching relation with respect to said block means; and actuating means connected with said block means for advancing said block means and said punch members into punching relation with said record slip whereby punch members passing through perforations in said card punch out opposed prescored tabs in said slip.

2. A machine as stated in claim 1 wherein said punch block means includes a punch member movable in a plane normal to the axis of the punch member for selectively positioning said punch member relative to said punch block means and to said record slip for variable selection of data.

3. A machine as stated in claim 1, including means for variably selecting data and transmitting said selection to said punch block means.

4. In a data recording machine adapted to occupy a minimum of counter space and to transfer data from a perforated data-bearing card to a record from having prescored tabs comprising: a carrier means movable in a selected generally vertically path; means on said carrier means for orienting a data-bearing card; means on said carrier means for orienting laterally and longitudinally a record form with respect to and independently of the data-bearing card; a punch block means provided with a plurality of punch members and movable toward said carrier means; means for orienting said carrier means in operative punching relation with respect to said punch block means; an actuating means connected with said punch block means for advancing said block means and said punch members toward and into punching relation with said record form whereby punch members passing through perforations in said data card punch out opposed tabs in said record form.

5. A machine as stated in claim 4, including variable data selector means connected with certain of said punch members on said punch block means; and means rendering said actuating means inoperative until actuation of said variable data selector means.

6. A machine as stated in claim 4, including variable data selector means comprising vertically arranged and movable data selector key bar members, means interconnecting each key bar member with certain of said punch members on said punch block means, and means mounting said certain punch members for movement in accordance with movement of said key bar members.

7. A machine as stated in claim 4, including means for releasably interengaging said punch block means and said carrier means for precisely orienting said carrier means and said punch block means during a punching operation.

8. A machine as stated in claim 4, including means for releasably holding said carrier means in a position in said path for a punching operation, and means for releasing said last mentioned means upon advancement of said punch block means toward said carrier means.

9. A machine as stated in claim 4, including interlock means operatively interconnecting said carrier means, said variable data selector means and said actuating means for inhibiting actuation of said machine under certain conditions.

10. In a data recording machine, the combination of: a frame means; a housing for said frame and including a front wall provided with an opening adjacent one side thereof; a carrier means slidably mounted on said frame means for movement in said opening and adapted to receive in one position a card bearing information and a separately independently insertable record form to which data on said card is to be transferred; said card and form being in face-to-face relation; said carrier means being movable to a second position for a punching operation; key bar means bearing indicia to be selected arranged at said front wall adjacent said carrier means; said key bar means including a plurality of vertically movable key bar members; a punch block means within the housing and movably mounted on said frame means for movement toward said carrier means for movement toward said carrier means in its second position, said punch block means including a plurality of spring biased punch members, certain of said biased punch members being movable laterally of said punch block means; means interconnecting said key bar members and said certain laterally movable punch members for selectively positioning said punch members in accordance with indicia selected; and means connected with said punch block means for actuating said punch block means and for moving said punch members toward and into punching relation with said record form.

11. A machine as stated in claim 10 wherein said actuating means includes an actuating arm pivotally connected to said frame means, and a carriage movably mounted on said frame means for translating motion of said arm into movement of said punch block means toward said carrier means.

12. A machine as stated in claim 10 including means on said frame means for releasably holding said carrier means in its second position; means on said punch block means for interlocking and orienting engagement with said carrier means for holding said carrier means in said second position during a punching operation; and means carried by said punch block means operative to release said holding means on said frame for said carrier means after said interlock means is engaged.

13. A machine as stated in claim 12 including interlock means operatively interconnecting said actuating means and said carrier means whereby said actuating means is rendered inoperative until the carrier means is in its second position for a punching operation.

14. A machine as stated in claim 10 including printing means carried by said frame means; and means cooperably connecting said printing means and said carrier means whereby movement of said carrier means between its two positions will actuate said printing means into printing contact with said record form.

15. A data transport and carrier means for use with a data processing machine including a punching and printing operation comprising an elongated frame; a perforated block member carried by said frame; means for receiving and holding a data-bearing card in oriented relation with respect to said perforated block member; means for inserting and positioning a record form over said card and said perforated block member and in oriented relation with respect thereto; and means at one end of said carrier frame for biased engagement with said record form for positively longitudinally orienting said record form with respect to said frame.

16. A carrier means as stated in claim 15, including ejector means for said card.

17. In a data recording machine, a variable data selector means including an elongated key bar member having a plurality of forwardly projecting angle-shaped elements defining a plurality of finger receiving recesses; said member being provided with a longitudinally extending back opening slot; and a ratchet member received within said slot and movable relative to said key bar member; said key bar member having a back face provided with a plurality of longitudinally spaced camming faces adapted to release a latch dog engaged with said ratchet member.

18. In a data recording machine adapted to transfer data from a code card to a record form comprising in combination an upstanding frame means adapted to occupy relatively small horizontal area; said frame means defining a vertically arranged punching zone and a vertically arranged variable data selector zone; a carrier means for said card and said record form and providing separate openings for independent separate insertion of said card and said form into said carrier means; separate means on said carrier means for positively orienting said card and said record form with respect to each other; guide means on said frame means and on said carrier means for guiding said carrier means into a punch position; a punch block means carried by said frame means in said punching zone and movable toward said carrier means in punching position; means for aligning said carrier means and said punch block means prior to a punching operation; means including a plurality of key bar members generally vertically arranged in said selector zone and mounted for slidable movement on said frame means; means interconnecting each key bar means with an associated punch member on said punch block means; and actuating means including an actuating arm movable across said punching and selector zones for performing a punching operation.

19. In combination with a data recording machine: a holding means for positioning a data bearing perforated card and a data record form in adjacent face to face relation for transfer of data from said card to said record form; a punch block means provided with a plurality of punch members opposed to said holding means and movable toward and away from said card and record form; guiding and alignment means for said punch members with respect to said positioned card and record form; and actuating means connected with said punch block means for advancing said block means and said punch members into punching relation with said record form.

20. In a machine as stated in claim 19 including means for supporting said record form when said punch members penetrate said form in a punching operation.

21. In combination with a data recording machine, the provision of: an elongated frame; a perforated member carried by said frame; means on said frame for receiving and holding a data bearing card in oriented relation with respect to said perforated member; means for inserting and positioning a record form with respect to said card and to said perforated member and in oriented relation thereto; and means carried by said frame for engagement with said record form for positively longitudinally orienting said record form with respect to said frame.

22. In combination with a data recording machine, the provision of: variable data selector means including an elongated key bar member having a plurality of forwardly projecting elements defining a plurality of spaced finger receiving recesses; and a ratchet member cooperably associated with the back of said key bar member and adapted to cooperate with a latch dog for holding said key bar member in a selected position.

23. In a data recording machine the provision of: a variable data selector means including an elongated key bar member having a plurality of longitudinally spaced, forwardly projecting elements having inclined surfaces defining a plurality of spaced finger receiving recesses; means associated with said key bar member for holding said member in a selected position; and tape means connected with said key bar member and adapted to be connected with a punch member whereby selective positioning of said key bar member will move said punch member to correspondingly position said punch member.

References Cited by the Examiner

UNITED STATES PATENTS 3,023,952  3/1962  Thomas _____ 235—61.1

MALCOLM A. MORRISON, *Primary Examiner.*

WALTER W. BURNS, Jr., *Examiner.*